(12) United States Patent
Srivastava et al.

(10) Patent No.: US 8,869,273 B2
(45) Date of Patent: Oct. 21, 2014

(54) APPARATUS AND METHOD FOR ENHANCING SECURITY OF DATA ON A HOST COMPUTING DEVICE AND A PERIPHERAL DEVICE

(75) Inventors: Gita Srivastava, Dallas, TX (US); Piyush B. Srivastava, Dallas, TX (US)

(73) Assignee: Gigavation, Inc., Dallas, TX (US)

( * ) Notice: Subject to any disclaimer, the term of this patent is extended or adjusted under 35 U.S.C. 154(b) by 134 days.

(21) Appl. No.: 13/571,310

(22) Filed: Aug. 9, 2012

(65) Prior Publication Data

US 2013/0031629 A1     Jan. 31, 2013

Related U.S. Application Data

(63) Continuation-in-part of application No. 13/011,297, filed on Jan. 21, 2011, now Pat. No. 8,566,934.

(60) Provisional application No. 61/522,138, filed on Aug. 10, 2011.

(51) Int. Cl.
  *G06F 21/00* (2013.01)
  *G06F 21/85* (2013.01)
  *G06F 21/55* (2013.01)
  *G06F 21/60* (2013.01)

(52) U.S. Cl.
  CPC .............. *G06F 21/554* (2013.01); *G06F 21/85* (2013.01); *G06F 21/606* (2013.01)
  USPC ......................................................... 726/22

(58) Field of Classification Search
  CPC ....... G06F 21/00; G06F 21/606; G06F 21/83; G06F 21/84; G06F 21/85
  See application file for complete search history.

(56) References Cited

U.S. PATENT DOCUMENTS

| | | | | |
|---|---|---|---|---|
| 5,968,176 | A | * | 10/1999 | Nessett et al. ................... 726/11 |
| 6,067,589 | A | | 5/2000 | Mamata .......................... 710/63 |
| 6,088,802 | A | | 7/2000 | Bialick et al. .................. 713/200 |
| 6,216,183 | B1 | | 4/2001 | Rawlins ........................ 710/100 |

(Continued)

FOREIGN PATENT DOCUMENTS

| | | | | |
|---|---|---|---|---|
| JP | 2002124966 | A | * 4/2002 | |
| WO | WO 2006/090091 | | 8/2006 | ............... G06F 1/00 |

OTHER PUBLICATIONS

International Searching Authority, International Search Report together with the Written Opinion for International Application No. PCT/US2012/050213, 11 pages, Jan. 24, 2013.

(Continued)

*Primary Examiner* — Jeffery Williams
*Assistant Examiner* — Christopher C Harris
(74) *Attorney, Agent, or Firm* — Sunstein Kann Murphy & Timbers LLP

(57) ABSTRACT

A method of enhancing security of at least one of a host computing device and a peripheral device coupled to the host computing device through a communication interface. Data is transparently received from the peripheral device or the host computing device, and the received data is stored. The stored data is analyzed to detect a circumstance associated with a security risk. If such a circumstance is not detected, then the data is transparently forwarded to the other of the peripheral device or the host. However, if a circumstance associated with a security risk is detected, then a security process, defined by a rule, is performed. Related apparatus are provided, as well as other methods and apparatus.

38 Claims, 30 Drawing Sheets

(56) References Cited

U.S. PATENT DOCUMENTS

| | | | |
|---|---|---|---|
| 6,311,294 B1 | 10/2001 | Larky et al. | 714/44 |
| 6,343,260 B1 | 1/2002 | Chew | 702/122 |
| 6,366,877 B1 | 4/2002 | Nishino et al. | 703/25 |
| 6,389,495 B1 | 5/2002 | Larky et al. | 710/8 |
| 6,389,560 B1 | 5/2002 | Chew | 714/43 |
| 6,435,904 B1 * | 8/2002 | Herbst et al. | 439/534 |
| 6,480,801 B2 | 11/2002 | Chew | 702/122 |
| 6,523,081 B1 | 2/2003 | Karlsson et al. | 710/305 |
| 6,526,468 B1 * | 2/2003 | Larochelle et al. | 710/305 |
| 6,601,109 B1 | 7/2003 | Bealkowski et al. | 709/250 |
| 6,618,807 B1 | 9/2003 | Wang et al. | 713/189 |
| 6,671,765 B1 | 12/2003 | Karlsson et al. | 710/310 |
| 6,678,760 B2 | 1/2004 | Brief | 710/52 |
| 6,678,761 B2 | 1/2004 | Garney et al. | 710/60 |
| 6,684,402 B1 | 1/2004 | Wolff | 725/105 |
| 6,697,372 B1 | 2/2004 | McAlear | 307/402 |
| 6,708,247 B1 | 3/2004 | Barret et al. | 710/313 |
| 6,718,412 B2 | 4/2004 | Purcell et al. | 710/109 |
| 6,721,332 B1 | 4/2004 | McAlear | 370/466 |
| 6,745,264 B1 | 6/2004 | Luke et al. | 710/52 |
| 6,754,811 B1 | 6/2004 | Cato et al. | 712/227 |
| 6,757,770 B1 | 6/2004 | Terada et al. | 710/260 |
| 6,757,776 B1 | 6/2004 | Pew | 710/310 |
| D494,969 S | 8/2004 | Lin | D14/480.7 |
| 6,782,443 B2 | 8/2004 | Ferguson | 710/313 |
| 6,783,078 B1 | 8/2004 | Learning | 235/492 |
| 6,792,501 B2 | 9/2004 | Chen et al. | 711/103 |
| 6,804,243 B1 | 10/2004 | Humphrey et al. | 370/395.1 |
| 6,839,771 B1 | 1/2005 | Bouchier et al. | 709/253 |
| 6,839,793 B2 | 1/2005 | Ragland | 710/316 |
| 6,880,054 B2 | 4/2005 | Cheng et al. | 711/164 |
| 6,886,055 B2 | 4/2005 | Heller et al. | 710/62 |
| 6,889,265 B2 | 5/2005 | Garney et al. | 710/18 |
| 6,900,988 B2 | 5/2005 | Yen | 361/737 |
| 6,904,493 B2 | 6/2005 | Chiao et al. | 711/103 |
| 6,931,465 B1 | 8/2005 | Cordner | 710/62 |
| 6,934,774 B1 | 8/2005 | Sundaram et al. | 710/19 |
| 6,954,808 B2 | 10/2005 | Russell | 710/62 |
| 6,959,257 B1 | 10/2005 | Larky et al. | 702/120 |
| 6,968,462 B2 | 11/2005 | Challener et al. | 726/26 |
| 6,996,705 B2 | 2/2006 | Cheston et al. | 713/1 |
| 7,003,613 B1 | 2/2006 | Wang et al. | 710/305 |
| 7,011,247 B2 | 3/2006 | Drabczuk et al. | 235/451 |
| 7,039,759 B2 | 5/2006 | Cheng et al. | 711/115 |
| 7,044,390 B2 | 5/2006 | Learning | 235/492 |
| 7,051,124 B2 | 5/2006 | Ishida et al. | 710/29 |
| 7,069,373 B2 | 6/2006 | Teng | 710/310 |
| 7,073,010 B2 | 7/2006 | Chen et al. | 710/313 |
| 7,080,789 B2 | 7/2006 | Learning | 235/492 |
| 7,082,483 B2 | 7/2006 | Poo | 710/68 |
| 7,114,105 B2 | 9/2006 | Rao et al. | 714/38.1 |
| 7,124,233 B2 | 10/2006 | Tang | 710/313 |
| 7,127,649 B2 | 10/2006 | Learning | 714/715 |
| 7,143,208 B2 | 11/2006 | Tsutsui | 710/33 |
| 7,143,224 B2 | 11/2006 | Learning | 710/301 |
| 7,145,481 B2 | 12/2006 | Cooper | 341/26 |
| 7,149,833 B2 | 12/2006 | McLeod | 710/300 |
| 7,162,407 B2 | 1/2007 | Poley et al. | 703/24 |
| 7,168,029 B2 | 1/2007 | Lai et al. | 714/781 |
| 7,181,649 B2 | 2/2007 | Fruhauf et al. | 714/32 |
| 7,185,136 B2 | 2/2007 | Zarns | 710/315 |
| 7,188,206 B2 | 3/2007 | Tung et al. | 710/302 |
| 7,213,096 B2 | 5/2007 | Keys et al. | 710/313 |
| 7,213,766 B2 | 5/2007 | Ryan et al. | 235/492 |
| 7,222,201 B2 | 5/2007 | Augustin et al. | 710/105 |
| 7,228,366 B2 | 6/2007 | Abramson et al. | 710/19 |
| 7,243,237 B2 | 7/2007 | Peinado et al. | 713/181 |
| 7,272,831 B2 | 9/2007 | Cota-Robles et al. | 718/1 |
| 7,296,098 B2 | 11/2007 | Shih | 710/13 |
| 7,321,951 B2 | 1/2008 | Wong et al. | 711/103 |
| 7,328,849 B2 | 2/2008 | Learning | 235/492 |
| 7,337,261 B2 | 2/2008 | Sukegawa et al. | 710/313 |
| 7,351,147 B2 | 4/2008 | Stockdale et al. | 463/29 |
| 7,353,399 B2 | 4/2008 | Ooi et al. | 713/186 |
| 7,359,997 B2 | 4/2008 | Ishida et al. | 710/31 |
| 7,364,436 B2 | 4/2008 | Yen | 439/76.1 |
| 7,369,982 B2 | 5/2008 | Learning | 703/25 |
| 7,373,522 B2 | 5/2008 | Learning | 713/193 |
| 7,396,257 B2 | 7/2008 | Takahashi | 439/620.21 |
| 7,418,377 B2 | 8/2008 | Poley et al. | 703/24 |
| 7,447,037 B2 | 11/2008 | Hiew et al. | 361/737 |
| 7,447,821 B2 | 11/2008 | Ferchau et al. | 710/301 |
| 7,454,531 B2 | 11/2008 | Shih | 710/13 |
| 7,454,783 B2 | 11/2008 | Dupouy et al. | 726/7 |
| 7,461,318 B2 | 12/2008 | Fukae et al. | 714/749 |
| 7,469,343 B2 | 12/2008 | Ray et al. | 713/189 |
| 7,478,424 B2 | 1/2009 | Mester et al. | 726/11 |
| 7,480,931 B2 | 1/2009 | Weiss | 726/2 |
| 7,489,417 B2 | 2/2009 | Tran et al. | 358/1.16 |
| 7,490,255 B2 | 2/2009 | Diefenbaugh et al. | 713/320 |
| 7,493,431 B2 | 2/2009 | McLeod | 710/63 |
| 7,496,493 B1 | 2/2009 | Stevens | 703/24 |
| 7,516,261 B2 | 4/2009 | Ferchau et al. | 710/301 |
| 7,540,024 B2 | 5/2009 | Phillips et al. | 726/20 |
| 7,549,161 B2 | 6/2009 | Poo et al. | 726/5 |
| 7,555,578 B2 | 6/2009 | Lim et al. | 710/52 |
| 7,587,536 B2 | 9/2009 | McLeod | 710/65 |
| 7,597,250 B2 | 10/2009 | Finn | 235/380 |
| 7,631,121 B2 | 12/2009 | Poo | 710/52 |
| 7,634,670 B2 | 12/2009 | Nago et al. | 713/300 |
| 7,636,844 B2 | 12/2009 | Bajikar | 713/171 |
| 7,640,378 B2 | 12/2009 | McLeod | 710/29 |
| RE41,076 E | 1/2010 | Chu | 726/34 |
| 7,644,211 B2 | 1/2010 | Toebes et al. | 710/106 |
| 7,647,446 B2 | 1/2010 | Okuma | 710/313 |
| D610,156 S | 2/2010 | Mudrick | D14/480.5 |
| 7,664,960 B1 | 2/2010 | Clubb | 713/184 |
| RE41,294 E | 4/2010 | Chu | 713/193 |
| 7,702,825 B2 | 4/2010 | Howard | 710/18 |
| 7,703,688 B2 | 4/2010 | Drabczuk et al. | 235/492 |
| 7,704,147 B2 | 4/2010 | Quraishi et al. | 463/42 |
| 7,711,874 B1 | 5/2010 | Ilyasov et al. | 710/52 |
| 7,725,610 B2 | 5/2010 | Hosokawa | 710/6 |
| 7,733,902 B2 | 6/2010 | Coulier | 370/466 |
| 7,734,841 B2 | 6/2010 | Townsend | 710/16 |
| 7,743,409 B2 | 6/2010 | Gonzalez et al. | 726/9 |
| 7,747,797 B2 | 6/2010 | Abraham et al. | 710/62 |
| 7,748,031 B2 | 6/2010 | Gonzalez et al. | 726/9 |
| 7,761,646 B2 | 7/2010 | Okuma | 710/313 |
| 7,762,470 B2 | 7/2010 | Finn et al. | 235/492 |
| 7,773,732 B2 | 8/2010 | Gesquiere et al. | 379/93.01 |
| 7,788,447 B2 | 8/2010 | Deng et al. | 711/115 |
| 7,793,014 B2 | 9/2010 | Paley et al. | 710/36 |
| 7,870,599 B2 | 1/2011 | Pemmaraju | 726/2 |
| 7,877,788 B1 | 1/2011 | Topp et al. | 726/4 |
| 8,417,840 B2 * | 4/2013 | Santhanam et al. | 710/15 |
| 2004/0168009 A1 * | 8/2004 | Szabelski | 710/313 |
| 2005/0114515 A1 * | 5/2005 | Droms | 709/227 |
| 2006/0036780 A1 * | 2/2006 | Dernis et al. | 710/36 |
| 2006/0156415 A1 | 7/2006 | Rubinstein et al. | 726/27 |
| 2006/0173980 A1 | 8/2006 | Kobayashi et al. | 709/222 |
| 2007/0261118 A1 | 11/2007 | Lu | 726/24 |
| 2008/0235528 A1 * | 9/2008 | Kim et al. | 713/324 |
| 2008/0276302 A1 | 11/2008 | Touboul | 726/3 |
| 2009/0043925 A1 | 2/2009 | Govindaraman | 710/38 |
| 2009/0185215 A1 * | 7/2009 | Kreppold et al. | 358/1.15 |
| 2009/0235365 A1 | 9/2009 | Kuo et al. | 726/29 |
| 2009/0307452 A1 | 12/2009 | Hahn et al. | 711/164 |
| 2011/0022768 A1 * | 1/2011 | Ulenas | 710/311 |
| 2011/0289548 A1 | 11/2011 | Heidenreich et al. | 726/1 |
| 2012/0042099 A1 | 2/2012 | Wong et al. | 710/9 |
| 2012/0192271 A1 | 7/2012 | Srivastava et al. | 726/22 |

OTHER PUBLICATIONS

United States Patent and Trademark Office, Office Action of U.S. Appl. No. 13/011,297, 34 pages, Nov. 7, 2012.

International Searching Authority, International Search Report together with the Written Opinion for International Application No. PCT/US2012/021905, 10 pages, Jul. 30, 2012.

\* cited by examiner

APPARATUS AND METHOD FOR ENHANCING SECURITY OF DATA ON A HOST COMPUTING DEVICE AND A PERIPHERAL DEVICE

CROSS REFERENCE TO RELATED APPLICATIONS

This application claims the benefit of U.S. Provisional Patent Application No. 61/522,138, filed Aug. 10, 2011, titled "Apparatus and Method for Enhancing Security of Data on a Host Computing Device and a Peripheral Device," and this application is a continuation-in-part of U.S. patent application Ser. No. 13/011,297, filed Jan. 21, 2011, titled "Apparatus and Method for Enhancing Security of Data on a Host Computing Device and a Peripheral Device," the entire contents of all of which are hereby incorporated by reference herein, for all purposes.

TECHNICAL FIELD

The present invention relates to an apparatus and method for enhancing security of data on at least one of a host computing device and a peripheral device, and more particularly when such devices are engaged in communication through a communication interface.

BACKGROUND ART

A bus network topology is a computer network architecture in which two or more clients are interconnected via a shared communications line, called a bus. The bus may employ serial or parallel signaling and address and data transfer. Exemplary busses include Universal Serial Bus (USB) and IEEE 1394 (commonly referred to as "FireWire"). In some cases, "hubs" are used to "fan out" a given bus, via individual interfaces, to several clients. Such hubs are commonly used to enable computer system users to attach several devices, such as keyboards, mice and rotating or solid state mass storage devices (magnetic and solid state "disk drives") to a single computer system. In some cases, the hubs may be external to the computer system, and in other cases the hubs may be internal, such as on a motherboard of the computer system.

In a bus network topology, more than one client connected to a bus, such as via a hub, share the bus's bandwidth. Furthermore, more than one client has access to the commands, addresses and data that are sent over the bus. Each client is assigned an address, and protocols defined for these busses specify that clients should ignore commands and data that are not addressed to the clients.

However, in prior art bus network topologies, a rogue client may read commands, addresses and data that are carried by the bus, but that are not meant for the client. Such a rogue client may, for example, store a copy of such "sniffed" data in a memory and later make the stored data available to a third party, unbeknownst to the owner of the system in which the bus resides. Such a rogue client would, therefore, present a potential security problem for the system's owner.

For example, a hypothetical attacker may provide a USB device that appears to a typical user to be a common USB mass storage device ("thumb drive"). When first connected to a computer system, the device may automatically install a device driver to handle the device. Many such devices automatically install device drivers, without raising suspicions by their users. The rogue device may perform functions consistent with conventional USB mass storage devices, thereby appearing to the user to be operating as expected.

However, the device may also include additional memory and circuitry or programming that is not disclosed to the user. While the device is connected to a USB, the device may store, in the additional memory, copies of selected data carried by the USB, but not addressed to the device. Some of this data may be sensitive, such as proprietary information or personally identifiable information, e.g., name, birth date, bank account number or password, about the user. Later, when the device driver detects that the computer system is coupled to the Internet, the device or the device driver may send the surreptitiously acquired data to the attacker, via the Internet. Another such rogue device may include a radio-frequency (RF) transmitter, and the device may send the data to the attacker via an RF signal.

Thus, prior art bus network topologies are vulnerable to attacks, in which data may be surreptitiously obtained by third parties.

SUMMARY OF THE EMBODIMENTS

In a first embodiment of the invention there is provided a method of enhancing security of at least one of a host computing device and a peripheral device. The host computing device is coupled to the peripheral device through a communication interface. The method includes transparently receiving data from one of the peripheral device and the host computing device, automatically storing the received data, and automatically analyzing the stored data to identify a circumstance posing a security risk. The method further includes, if the analyzing does not identify such a circumstance, automatically transparently forwarding the data to the other of the peripheral device and the host. The method further includes, if the analyzing does identify such a circumstance, automatically performing a security process defined by a rule. The method optionally may further include implementing a preservation process that automatically precludes inter-device communication termination.

The host computing device may be removably coupled to the peripheral device through the communication interface.

In another embodiment of the invention there is provided a method of enhancing security of at least one of a host computing device and a peripheral device. The host computing device is coupled to the peripheral device through a communication interface. The method includes receiving data from one of the peripheral device and the host computing device, automatically storing the received data, implementing a preservation process that automatically precludes inter-device communication termination, and automatically analyzing the stored data to identify a circumstance posing a security risk. The method further includes, if the analyzing does not identify such a circumstance, automatically forwarding the data to the other of the peripheral device and the host. The method further includes, if the analyzing does identify such a circumstance, automatically performing a security process defined by a rule. Alternatively, or in addition, the preservation process includes automatically sending a signal other than a data forward. In a further related embodiment, the signal may include a (commonly referred to as "NAK" or "NACK") signal.

With respect to embodiments in the foregoing paragraphs, analyzing optionally includes implementing an analyzing process that tests the received data against a database to identify a circumstance posing a security risk. Also optionally, a further embodiment further includes causing the database to be updated to include additional circumstances posing a security risk. Alternatively or in addition, the analyzing process includes accessing the database with a hash algorithm. The host computing device may be removably coupled to the peripheral device through the communication interface.

In related embodiments, the security process includes automatically encrypting data being sent to the peripheral device. The security process optionally includes one or more of: automatically restricting communication between the host and the peripheral in accordance with the rule, automatically modifying data in accordance with the rule, and automatically delaying transmission of data between the host and the peripheral in accordance with the rule. Also optionally, the security process implements a secondary process that includes storing a log copy of at least a portion of the data. The security process optionally implements a secondary process that includes notifying a user over a second communication interface. The rule optionally is selected based on a nature of the peripheral device. In a further related embodiment, the rule also is dynamic and selected based on an input provided by the host device. In another related embodiment, the rule is dynamic and is selected based on an input provided by a user. In another related embodiment, the rule is dynamic and is selected based on a state describing at least one of the host, the peripheral, and the communication interface. In another related embodiment, the rule is dynamic and is selected from a plurality of rules, and the plurality of rules is stored on the host device. In another related embodiment, the rule is dynamic and is selected from a plurality of rules, and the plurality of rules is stored on the peripheral device. In another related embodiment, the rule is dynamic and is selected from a plurality of rules, and the plurality of rules is stored on a module that implements the processes for enhancing security. The host computing device may be removably coupled to the peripheral device through the communication interface.

Optionally, the rule is dependent on a characteristic of the data. Also optionally, the rule is selected based on a configuration of the host computing device. Alternatively, the rule is selected based on a protocol of the communication interface. Alternatively, the security process comprises an isolation process that electrically isolates the peripheral device from the host computing device.

In a further embodiment, there is provided a method of enhancing security of at least one of a host computing device and a peripheral device having a human interface, wherein the host computing device is coupled to the peripheral device through a communication interface. The method of this embodiment includes receiving data from the peripheral device characterizing its nature and implementing an authentication process based on the received data; such process includes issuing a challenge requiring a user response to be entered on the peripheral device. The method also includes analyzing data received from the peripheral device purporting to be attributable to the user response to determine whether the peripheral device behaves in a manner expected based on its nature.

In related embodiments, the challenge is issued via a display or, alternatively, via a sound. The method optionally further includes, if the peripheral device remains idle for a specified period of time, repeating the processes of implementing the authentication process and analyzing data.

In a further embodiment, there is provided a method of customizing user input capabilities from a peripheral device to a host computing device, wherein the host computing device is coupled to the peripheral device through a communication interface. The method of this embodiment includes (a) receiving data from the peripheral device characterizing its nature, (b) receiving data from the peripheral device purporting to be attributable to user input, (c) storing the data received in steps (a) and (b), and analyzing the data stored in step (c) to identify a circumstance defined by an identification rule. The method further includes if analyzing does not identify such a circumstance, then forwarding this or future data to the host computing device. The method further includes if analyzing does identify such a circumstance, then performing a customization process defined by a customization rule. The host computing device may be removably coupled to the peripheral device through the communication interface.

In a related embodiment, the identification rule identifies a circumstance associated with a risk of malicious activity. In another related embodiment, the identification rule identifies a user-specified emergency, and the customization rule includes triggering a response to the emergency. Optionally, the customization process includes modifying the data purporting to be attributable to user input. Optionally, the customization process precludes communication of at least a portion of the data purporting to be attributable to user input to the host computing device. In a related embodiment, the circumstance poses a security risk and the customization process includes implementing countermeasures determined by rule to reduce the security risk. In another related embodiment, implementing countermeasures includes executing them on the host computing device.

In a further embodiment there is provided a method of enhancing security of data that are communicated between a host computing device coupled to a peripheral device through a communication interface. The method of this embodiment includes identifying, at a file level, data being subject to a write command to the peripheral device, encrypting the file level data, according to a rule, with an encryption process, and causing storage of the encrypted file level data on the peripheral device. In a related embodiment, the encryption process is selected independently for each file that is encrypted. The host computing device may be removably coupled to the peripheral device through the communication interface.

In a further embodiment, there is provided a method of enhancing security of data that are communicated between a host computing device coupled to a peripheral device through a communication interface. The method of this embodiment includes identifying data at a file level being subject to a read command from the peripheral device, decrypting the file level data, according to a rule, with a decryption process, and causing storage of the decrypted file level data on the host computing device. The host computing device may be removably coupled to the peripheral device through the communication interface.

In a related embodiment, the decryption process is selected independently for each file that is decrypted. In a related embodiment, the rule is selected based on a characteristic of the data to be transmitted. In another related embodiment, the rule is selected based on at least one of a nature of the peripheral and a state describing the peripheral. In another related embodiment, the rule is selected based on at least one of a configuration of the host computing device and a state describing the host computing device. In another related embodiment, the rule is selected based on an identity of a user determined in an authentication process.

In a further embodiment there is provided a method of enhancing security of data that are communicated between a host computing device coupled to a peripheral device through a communication interface. The method of this embodiment includes receiving data from the host computing device, storing the received data, implementing a preservation process that precludes inter-device communication termination, analyzing the stored data to determine an analysis of what part thereof, if any, to encrypt, encrypting the stored data in accordance with the analysis, and causing the encrypted data to be transferred to the peripheral device.

In a further embodiment there is provided a method of enhancing security of data that are communicated between a host computing device coupled to a peripheral device through a communication interface. The method of this embodiment includes receiving data from the peripheral device, storing the received data, implementing a preservation process that precludes inter-device communication termination, analyzing the stored data to determine an analysis of what part thereof, if any, to decrypt, decrypting the stored data in accordance with the analysis, and causing the decrypted data to be transferred to the host computing device. The host computing device may be removably coupled to the peripheral device through the communication interface.

In a related embodiment, the analysis is performed based on a characteristic of the data to be transmitted. In another related embodiment, the analysis is performed based on at least one of a nature of the peripheral and a state describing the peripheral. In another related embodiment, the analysis is performed based on at least one of a configuration of the host computing device and a state describing the host computing device. In another related embodiment, the analysis is performed based on an identity of a user determined in an authentication process.

In further embodiments there is provided a security device comprising a hardware arrangement configured to cause implementation of the method according to any of the previously described embodiments.

In a further embodiment there is provided a security device for enhancing security of at least one of a host computing device and a peripheral device; the host computing device is coupled to the peripheral device through a communication interface. The security device of this embodiment includes an apparatus running processes including transparently receiving data from one of the peripheral device and the host computing device, storing the received data, and analyzing the stored data to identify a circumstance posing a security risk. The method further includes if the analyzing does not identify such a circumstance, then transparently forwarding the data to the other of the peripheral device and the host. The method further includes if the analyzing does identify such a circumstance, then performing a security process defined by a rule. The host computing device may be removably coupled to the peripheral device through the communication interface.

In a further embodiment there is provided a security device for enhancing security of at least one of a host computing device and a peripheral device; the host computing device is coupled to the peripheral device through a communication interface. The security device includes an apparatus running processes including receiving data from one of the peripheral device and the host computing device, storing the received data, implementing a preservation process that precludes inter-device communication termination, and analyzing the stored data to identify a circumstance posing a security risk. The processes being run by the apparatus further include, if the analyzing does not identify such a circumstance, then forwarding the data to the other of the peripheral device and the host; and if the analyzing does identify such a circumstance, then performing a security process defined by a rule. The host computing device may be removably coupled to the peripheral device through the communication interface.

On many prior art bus architectures, data are broadcast from the host to all or several of the peripherals on the bus. In such cases, the peripheral should respond only to data that is addressed to it. However, as noted, rogue peripherals may respond, such as by copying data that is not addressed to the peripherals. These circumstances may pose security risks, so it may be advantageous to route data to only the peripheral or peripherals for which the data is intended or to otherwise control or monitor the flow of data between the host and any peripherals. Embodiments of the present invention perform such routing, control and/or monitoring. Thus, embodiments of the present invention solve the problem posed by the prior art by preventing data from being made available to unintended bus peripherals.

In another embodiment of the invention there is provided a method of managing communication on a network. The method includes receiving data from the network, automatically storing the received data, and automatically analyzing the stored data to detect or ascertain if a circumstance that represents a security risk exists. If the analyzing determines that such a circumstance exists, then a process defined by a rule is automatically performed. The method optionally may further include automatically precluding communication to one or more nodes in the network. The method optionally may further include precluding communication to one or more peripherals.

In another embodiment of the invention there is provided a method of managing communication on a network. The method includes receiving data from the network, storing the received data, and analyzing the stored data to ascertain if a circumstance that represents a security risk exists. If analyzing determines that such a circumstance exists, then a process defined by a rule is performed. The process optionally may further include receiving a control signal.

In another embodiment of the invention there is provided a method of managing communication on a network. The method includes receiving data from the network, storing the received data, and analyzing the stored data to ascertain if a circumstance that represents a security risk exists. If analyzing determines that such a circumstance exists, then a process defined by a rule is performed. The process optionally may further include terminating the transmission line.

In another embodiment of the invention there is provided a method of managing communication on a network. The method includes isolating communication to each end point, which may include disabling downstream hubs. The method optionally may include isolating communication to any peripheral(s) or the host.

A method is provided of managing communication on a network. The method includes receiving data from the network, and storing the received data. The method further includes analyzing the stored data to ascertain if a circumstance that represents a security risk exists. If analyzing determines that the data matches such a circumstance, then the method includes performing a process defined by a rule. Related apparatus is provided, as well as other methods and apparatus.

A method is provided of controlling data flow on a network. The method includes receiving data from the network, and storing the received data. The method further includes analyzing the stored data to ascertain if a circumstance that represents a security risk exists. If analyzing does ascertain that the data matches such a circumstance, then the method includes controlling recipients of data. Related apparatus is provided, as well as other methods and apparatus.

A method is provided of controlling data flow, along a line, between a host and peripheral(s). In an embodiment of the invention, the method includes silencing the line while certain data goes by, but maintenance of the connection by quickly un-silencing to let other communication, such as start of frame packets, go through. In a way, this is a preservation process. It includes strategic silencing so that data that is not addressed to a specific peripheral is not received by that specific peripheral. That is, data is only received by the peripheral to which it is intended. Related apparatus is provided, as well as other methods and apparatus.

In another embodiment of the invention there is provided a method of sending garbled or encrypted data to the peripherals that are not addressed. Encrypted data may, for example, include a data packet that is in accordance with the specification in length, start or end of packet delimiters, packet identifiers, or other such characteristics. Garbled data may for example include a data packet that may not adhere to a specification in one or more ways. In either case, the embodiment precludes data from being made available to unintended bus peripherals.

Yet another embodiment of the present invention provides a method of enhancing security of at least one of a host computing device and a peripheral device. The host computing device is coupled to the peripheral device through a communication interface. The method includes receiving data from one of the peripheral device and the host computing device. The received data is automatically stored, and the stored data is automatically analyzed. One of the host computing device and the peripheral device is automatically emulated to the other of the host computing device and the peripheral device.

The host computing device may be removably coupled to the peripheral device through the communication interface.

Another embodiment of the present invention provides a device. The device includes an apparatus running processes. The processes include a process configured to receive data from a network and a process configured to store the received data. Another process is configured to analyze the stored data to detect a circumstance associated with a security risk. Yet another process is configured to perform a process defined by a rule, if the circumstance associated with the security risk is detected.

In any method described above, the communication interface may be of a type supporting communication between the peripheral device and the host and vice versa, but not communication between the peripheral device and any other peripheral device coupled to the host computing device through the same communication interface. The network may include a master/slave network. The security process may include automatically precluding communication to one or more nodes in the network in accordance with the rule. The security process may include automatically terminating the transmission line in accordance with the rule. The security process may include automatically performing a filtering process that controls the recipients of the data. The host computing device may be removably coupled to one or more peripheral devices. The security process may include automatically restricting communication between the host and one or more peripheral devices. Analyzing the stored data may include automatically determining an addressed peripheral. Performing the security process may include automatically restricting communication between the host and peripherals that are not addressed. Performing the security process may include transparently automatically restricting communication between the host and the peripheral in accordance with the rule. The process may include receiving a control signal. Performing the security process may include automatically terminating data transmission. Performing the security process may include automatically silencing a line when certain data is transmitted, but allowing un-silencing for other data or communication to be transmitted based on a characteristic of any of the host, the peripheral, and the data being transmitted.

The method may include use of a security device for coupling between a host computing device ("host") and at least one peripheral device ("peripheral"). Each peripheral may be assigned an address. The security device may include an upstream interface configured to be coupled via a upstream link to the host and to automatically receive commands and data from the host via the upstream link. The upstream interface may be configured to automatically send data to the host via the upstream link. Each of at least some of the commands may include an address of one of the at least one peripheral. The security device may also include at least one downstream interface. Each downstream interface may be configured to be coupled via a respective downstream link to one of the at least one peripheral and to automatically receive data from the one peripheral via the respective downstream link. Each downstream interface may be configured to automatically send commands and data to the one peripheral via the respective downstream link. The security device may also include a controller coupled to the upstream and downstream interfaces and configured to forward commands and data received via the upstream interface to a selected at least one of the at least one downstream interface, based on a received address. The controller may be configured to forward data received via the downstream interface to the upstream interface.

Optionally, the controller may be configured to prevent forwarding data received via any of the at least one downstream interface to another of the at least one downstream interface.

Yet another embodiment of the present invention provides a security device for coupling between a host computing device ("host") and at least one peripheral device ("peripheral"). Each peripheral may be assigned an address. The security device includes an upstream interface configured to be coupled via an upstream link to the host and to receive commands and data from the host via the upstream link. The upstream interface is configured to send data to the host via the upstream link. Each of at least some of the commands includes an address of one of the at least one peripheral. The security device also includes at least one downstream interface. Each downstream interface is configured to be coupled via a respective downstream link to one of the at least one peripheral and to receive data from the one peripheral via the respective downstream link. Each downstream interface is configured to send commands and data to the one peripheral via the respective downstream link. The security device also includes a controller coupled to the upstream and downstream interfaces. The controller is configured to: receive commands and data via the upstream interface; select at least one of the at least one downstream interface, based on an address in the received commands and data; select at least one of the at least one downstream interface, based on an address in the received commands and data; and forward the received commands and data to a selected at least one of the at least one downstream interface.

Optionally, the controller is configured to garble the received commands and data and to forward the garbled commands and data to at least one of the at least one downstream interface, other than the selected at least one of the at least one downstream interface.

Another embodiment of the present invention provides a security device that includes a hardware arrangement configured to cause implementation of any of the above-described methods.

An embodiment of the present invention provides a security device for coupling between a host computing device ("host") and at least one peripheral device ("peripheral"). Each peripheral is assigned an address. The security device includes an upstream interface and at least one downstream interface. The upstream interface is configured to be coupled via an upstream link to the host. The upstream interface is configured to receive commands and data from the host via the upstream link. The upstream interface is configured to send data to the host via the upstream link. Each of at least some of the commands including an address of one of the at least one peripheral. Each downstream interface is configured to be coupled via a respective downstream link to one of the at least one peripheral. Each downstream interface is configured to receive data from the one peripheral via the respective downstream link and to send commands and data to the one peripheral via the respective downstream link. The security device also includes a controller coupled to the upstream and downstream interfaces. The controller is configured to receive commands and data via the upstream interface. The controller is configured to select at least one of the at least one downstream interface, based on an address in the received commands and data. The controller is configured to forward the received commands and data to the selected at least one of the at least one downstream interface.

The controller may be configured to prevent forwarding the received commands and data to at least one of the at least one downstream interface, other than the selected at least one of the at least one downstream interface.

The controller may be configured to prevent direct communication between any two of the at least one peripheral via a respective downstream link.

The controller may be configured to garble the received commands and data and forward the garbled commands and data to at least one of the at least one downstream interface, other than the selected at least one of the at least one downstream interface.

Each downstream interface may be configured to be removably coupled via the respective downstream link to the one of the at least one peripheral.

The controller may be configured to select the at least one of the at least one downstream interface by analyzing the received data during an analysis interval. The controller may be configured to, during at least a portion of the analysis interval, emulate the host or the peripheral to the other of the host and the peripheral.

The controller may be configured to emulate the host or the peripheral at least in part by generating an acknowledge (commonly referred to as "ACK") packet or a negative-acknowledge packet and sending the generated acknowledge packet or negative-acknowledge packet to the other of the host and the peripheral.

A device according to claim 6, wherein the controller is configured to emulate the host or the peripheral at least in part by coupling a termination resistor to the upstream link.

The controller may be configured to analyze the received data to ascertain if the received data poses a security risk. If the received data is ascertained not to pose a security risk, the controller may be configured to forward the received data to the selected at least one of the at least one downstream interface. If the received data is ascertained to pose a security risk, the controller may be configured to prevent forwarding the received data to any of the at least one downstream interface.

The controller may be configured to prevent forwarding the received data by changing the upstream link from a linked state to an electrically terminated state and changing at least one of the respective downstream link from a linked state to an electrically terminated state.

The controller may be configured to change the upstream link from a linked state to an electrically terminated state by coupling a termination resistor to the upstream link.

Another embodiment of the present invention provides a security device for coupling between a host computing device ("host") and at least one peripheral device ("peripheral"). The security device includes an upstream interface and at least one downstream interface. The upstream interface is configured to be coupled via an upstream link to the host and to receive data from the host via the upstream link and to send data to the host via the upstream link. Each downstream interface is configured to be coupled via a respective downstream link to one of the at least one peripheral and to receive data from the one peripheral via the respective downstream link and to send data to the one peripheral via the respective downstream link. The security device also includes a controller coupled to the upstream and downstream interfaces. The controller is configured to receive data via the upstream interface and analyze the received data to ascertain if the received data poses a security risk. If the received data is ascertained not to pose a security risk, the controller is configured to forward the received data to at least one of the at least one downstream interface. If the received data is ascertained to pose a security risk, the controller is configured to prevent forwarding the received data to any of the at least one downstream interface.

The controller may be configured to prevent forwarding the received data by changing the upstream link from a linked state to an electrically terminated state and changing at least one of the respective downstream link from a linked state to an electrically terminated state.

The controller may be configured to change the upstream link from a linked state to an electrically terminated state by coupling a termination resistor to the upstream link.

Yet another embodiment of the present invention provides a security device-implemented method of enhancing security of a host computing device ("host") or at least one peripheral device ("peripheral"). The security device includes an upstream interface and at least one downstream interface. The upstream interface is configured to be coupled via an upstream link to the host and to receive commands and data from the host via the upstream link and to send data to the host via the upstream link. Each of at least some of the commands including an address of one of the at least one peripheral. Each downstream interface is configured to be coupled via a respective downstream link to one of the at least one peripheral and to receive data from the one peripheral via the respective downstream link and to send commands and data to the one peripheral via the respective downstream link. Each peripheral is assigned an address. The method includes receiving commands and data via the upstream interface and selecting at least one of the at least one downstream interface, based on an address in the received commands and data. The method also includes forwarding the received commands and data to the selected at least one of the at least one downstream interface.

The method may include preventing forwarding the received commands and data to at least one of the at least one downstream interface, other than the selected at least one of the at least one downstream interface.

The method may include preventing direct communication between any two of the at least one peripheral via a respective downstream link.

The method may include garbling the received commands and data and forwarding the garbled commands and data to at least one of the at least one downstream interface, other than the selected at least one of the at least one downstream interface.

The method may include selecting the at least one of the at least one downstream interface by analyzing the received data during an analysis interval. During at least a portion of the analysis interval, the host or the peripheral may be emulated to the other of the host and the peripheral.

Emulating the host or the peripheral may include, at least in part, generating an acknowledge packet or a negative-acknowledge packet and sending the generated acknowledge packet or negative-acknowledge packet to the other of the host and the peripheral.

The method may include emulating the host or the peripheral, at least in part, by coupling a termination resistor to the upstream link.

The method may include analyzing the received data to ascertain if the received data poses a security risk. If the received data is ascertained not to pose a security risk, the method may include forwarding the received data to the selected at least one of the at least one downstream interface. If the received data is ascertained to pose a security risk, the method may include preventing forwarding the received data to any of the at least one downstream interface.

Preventing forwarding the received data may include changing the upstream link from a linked state to an electrically terminated state and changing at least one of the respective downstream link from a linked state to an electrically terminated state.

Changing the upstream link from a linked state to an electrically terminated state may include coupling a termination resistor to the upstream link.

An embodiment of the present invention provides a security device-implemented method of enhancing security of a host computing device ("host") or at least one peripheral device ("peripheral"). The security device includes an upstream interface and at least one downstream interface. The upstream interface is configured to be coupled via an upstream link to the host and to receive data from the host via the upstream link and to send data to the host via the upstream link. Each downstream interface is configured to be coupled via a respective downstream link to one of the at least one peripheral and to receive data from the one peripheral via the respective downstream link and to send data to the one peripheral via the respective downstream link. The method includes receiving data via the upstream interface and analyzing the received data to ascertain if the received data poses a security risk. If the received data is ascertained not to pose a security risk, the method includes forwarding the received data to at least one of the at least one downstream interface. If the received data is ascertained to pose a security risk, the method includes preventing forwarding the received data to any of the at least one downstream interface.

Preventing forwarding the received data may include changing the upstream link from a linked state to an electrically terminated state and changing at least one of the respective downstream link from a linked state to an electrically terminated state.

Changing the upstream link from a linked state to an electrically terminated state may include coupling a termination resistor to the upstream link.

Yet another embodiment of the present invention provides a computer program product for providing enhancing security of a host computing device ("host") or at least one peripheral device ("peripheral"). The security device includes an upstream interface and at least one downstream interface. The upstream interface is configured to be coupled via an upstream link to the host and to receive commands and data from the host via the upstream link and to send data to the host via the upstream link. Each of at least some of the commands including an address of one of the at least one peripheral. Each downstream interface is configured to be coupled via a respective downstream link to one of the at least one peripheral and to receive data from the one peripheral via the respective downstream link and to send commands and data to the one peripheral via the respective downstream link. Each peripheral is assigned an address. The computer program product includes a non-transitory computer-readable medium having computer readable program code stored thereon. The computer readable program is configured to receive commands and data via the upstream interface and select at least one of the at least one downstream interface, based on an address in the received commands and data. The computer readable program is configured to forward the received commands and data to the selected at least one of the at least one downstream interface.

Another embodiment of the present invention provides a computer program product for enhancing security of a host computing device ("host") or at least one peripheral device ("peripheral"). The security device includes an upstream interface and at least one downstream interface. The upstream interface is configured to be coupled via an upstream link to the host and to receive data from the host via the upstream link and to send data to the host via the upstream link. Each downstream interface is configured to be coupled via a respective downstream link to one of the at least one peripheral and to receive data from the one peripheral via the respective downstream link and to send data to the one peripheral via the respective downstream link. The computer readable program is configured to receive data via the upstream interface and analyze the received data to ascertain if the received data poses a security risk. If the received data is ascertained not to pose a security risk, the computer readable program is configured to forward the received data to at least one of the at least one downstream interface. If the received data is ascertained to pose a security risk, computer readable program is configured to prevent forwarding the received data to any of the at least one downstream interface.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
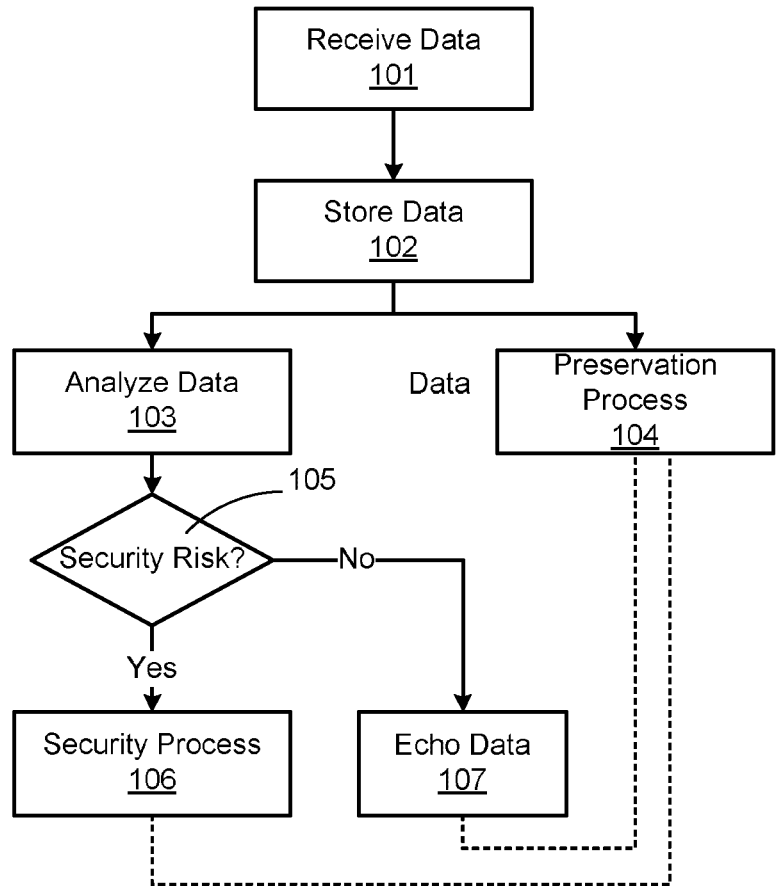
FIG. 1 is a block diagram of logical processes performed in accordance with an embodiment of the present invention.

Definitions. As used in this description and the accompanying claims, the following terms shall have the meanings indicated, unless the context otherwise requires:

A "host computing device" is a device having a processor configured to run a host computing process. The host computing device may be all or a part of a computing system.

A "peripheral device" is a component that is removably or non-removably connectable and physically proximate to a host computing device and that is configured to have bidirectional communication with the host computing device through a communication interface. The peripheral device may be at least one of: contained in the host computing device, plugged into the host computing device, and physically distinct from the host computing device. A peripheral is "physically proximate" to the host computing device if it is sufficiently close to the device as to permit communication between the peripheral and the host computing device through the communication interface. As an example, a peripheral device may be a USB device that is removably connectable to a host computing device through a USB interface. As another example, a peripheral device may be a video, keyboard, mouse, touchpad or other controller, packaged as an integrated circuit for soldering to a motherboard of a laptop or desk-side computer and for connection, via the soldering, to an appropriate bus or other interface on the motherboard. The peripheral device may operate with a wireless USB connection as well. The peripheral device may also be a hub. The peripheral device may also be physically coupled to the host device, such as a receiver that is built directly into a USB connector, so that when the connector is plugged in, the receiver is mounted to the host computing device via the USB connector. Alternatively, the peripheral device may be physically contained within the host and connected to it via a connector, soldered electrical connections or other suitable interface.

A "node on the network" can be one of a host computing device or a peripheral device.

"Analyzing" is a functionality performed by a computer.

"Receiving from one of" two sources, includes receiving from both.

A "circumstance posing a security risk" is a circumstance, other than garbling of data in a physical layer or transmission layer, deemed to put data at risk of unauthorized access, destruction, or disruption in availability.

"Implementing a preservation process that precludes inter-device communication termination" includes and is not limited to (i) acting fast enough that inter-device termination does not occur, (ii) issuing signals indicating receipt of data, (iii) issuing periodic signals such as start of frame packets, (iv) sending or receiving data in a manner that prevents a timeout condition, (v) issuing a transmission such that the transaction will be attempted again, (vi) adding electrical terminations such as those that indicate a successful connection, (vii) sending a negative-acknowledge, (viii) causing the peripheral to enter a suspend or idle state, (ix) maintaining bus protocol to keep the system in a known and desired state, (x) sending signals on behalf of another device (xi) sending signals that imitate another device, as well as (xii) issuing signals indicating the need for the data to be retransmitted, such as garbled data. "Interdevice communication termination" in this context means cessation of normal communication between devices.

At least one benefit of the preservation process includes maintaining communication. In many bus architectures, data must be communicated through more than one transaction. If, for example, data must be communicated through two transactions, the analyzing process performed on the second transaction must be conducted in such a way that the system does not lose the state that was reached by the first transaction. For example, if the communication lines are not electrically terminated according to a specification, the host may interpret this lack of electrical termination according to a specification as the peripheral being disconnected, and in order for future communication to occur, the peripheral's enumeration processes must be performed again.

Certain transactions do not have error checking and do not require a negative-acknowledge or acknowledge signal to be transmitted. This includes isochronous transfers such as audio data transfers where the emphasis is on maintaining the data flow and not error checking. Such transactions are intended to be within the scope of the present invention. For illustration, acknowledge and negative-acknowledge signals have been included in the descriptions of certain embodiments of the invention.

The "nature" of a peripheral device includes its functionality (for example, keyboard, hub, or printer) and optionally its identity (vendor ID, product ID, MAC Address).

The "configuration" of a host includes at least one of its hardware configuration, its software configuration (including its operating system), its computer network configuration (for example, computer network size/type, computer network connectivity) and its identity (vendor ID, product ID, MAC Address).

A "characteristic" of data includes at least one of its type (for example, metadata, executable, or text file), size, protocol used for sending of the data, value of the data, and any other property that may be derived from the data.

The "state" of a host, or peripheral, or a communication interface is a set of logical values characterizing the status of a state machine corresponding thereto.

A "rule" may depend on the nature or state of a node on the network, a characteristic of data on the network, or the configuration of the network.

"Coupled" includes indirect coupling through an intermediary device.

"Transparently" means carrying on communication in such a manner that the recipient of the communication fails to detect an additional node in the course of communication. Thus when a device communicates with a peripheral or with a host computing device and does not appear to the peripheral or the host computing device, as the case may be, as an additional node, the communication is performed "transparently". It is possible for a device to engage in communication with a peripheral or a host on one occasion, for example, when first connected to the host, in a manner as to appear to the host as a node, even though the same device might later engage in communication with the host and with a peripheral and fail to appear to the host and to the peripheral as a node. In the latter case, the communication is still deemed to be performed "transparently".

A described "process" is the performance of a described function in a computer using software, firmware, hardware (such as a processor or combinatorial logic) or a combination of any of these. All or part of the described function may be performed by active or passive electronic components, such as transistors or resistors. In using the term "process" we do not necessarily require a schedulable entity, although, in some embodiments, a process may be implemented by such a schedulable entity. Furthermore, unless the context otherwise requires, a "process" may be implemented using more than one processor or more than one (single- or multi-processor) computer.

FIG. 1 is a block diagram of logical processes performed in accordance with an embodiment of the present invention. In this embodiment, under process 101, data is "transparently" received from one of the peripheral devices and the host computing devices. Use of the term "transparently", as defined above, means that communication of data is achieved in a way that the host and peripheral fail to see an additional node receiving the data. In process 102, the received data is stored. In addition, this embodiment optionally includes implementing a preservation process 104 that precludes inter-device communication termination—in particular, the preservation process 104 precludes termination of communication between the peripheral and the host. In addition, while process 104 is ongoing, process 103 analyzes the stored data. In decision process 105, there is a determination of whether a security risk is posed. If no risk is posed, data is transparently forwarded, in process 107, to the other of the peripheral and the host. In other words, the processes herein are interposed in communications between the host and the peripheral. If no risk is posed, then data communications between the host and the peripheral are enabled. On the other hand, if process 105 determines that a security risk is posed, then there is performed a security process 106.

The processes shown in FIG. 1 may optionally be performed in an apparatus that is physically separate from the host and the peripheral. In another embodiment, however, the processes may be performed in hardware that is integrated into the host computing device. For example, software or firmware for performing the processes may be integrated into the host at the kernel or BIOS level. Alternatively, the processes may be integrated into at least one of the USB root hub and the south bridge. In yet additional embodiments, the processes may be performed in the peripheral device itself by direct integration into the peripheral or in a component that is physically coupled to the peripheral to make a compound device. In particular, among other things, the security process may be performed in hardware or in software in any of the foregoing locations.

In one embodiment, at least one of the data to be analyzed and results derived from analyzing the data are stored in a database. The user also optionally may be notified of processes that are occurring. For example, LED indicators may be used to indicate a state of at least one of the host computing device and the peripheral device. Optionally, when the processes of FIG. 1 are performed in an apparatus physically separate from the host and the peripheral, the LED indicators may be coupled to the apparatus, and, in a further embodiment, mounted to the apparatus.

The rules governing operation of the security process 106 also may be configurable by a user. For example, the user may specify which kinds of peripherals (e.g., cameras, printers) may be connected to the host. Further parameters also may be configured, such as specification of alternative rules according to an amount of time taken by data transfer to reach completion. One rule may disable all downstream hubs. At least one benefit of disabling all downstream hubs is the prevention of potential data leakage via improper or malicious hub operation. The rules may be stored locally or globally and may be dynamic. The rules may be dependent on the operating system or drivers on the host computing device or peripheral device. Rules may also discriminate between types of peripherals (e.g., keyboard, hard drive, camera, phone, etc.), types of data files (e.g., executable, text file, .xls, etc.), types of host (e.g., computer by name of A, computer in group A, windows machine, etc.), type of intercepting device/module (e.g., by model number or group number), and any other possible desired basis for discrimination. It should be noted that a host may be a computer, smartphone, tablet, personal digital assistant (PDA) or the like. Thus, some devices, such as smartphones, which may typically be considered peripherals can be hosts.

Figure 2:
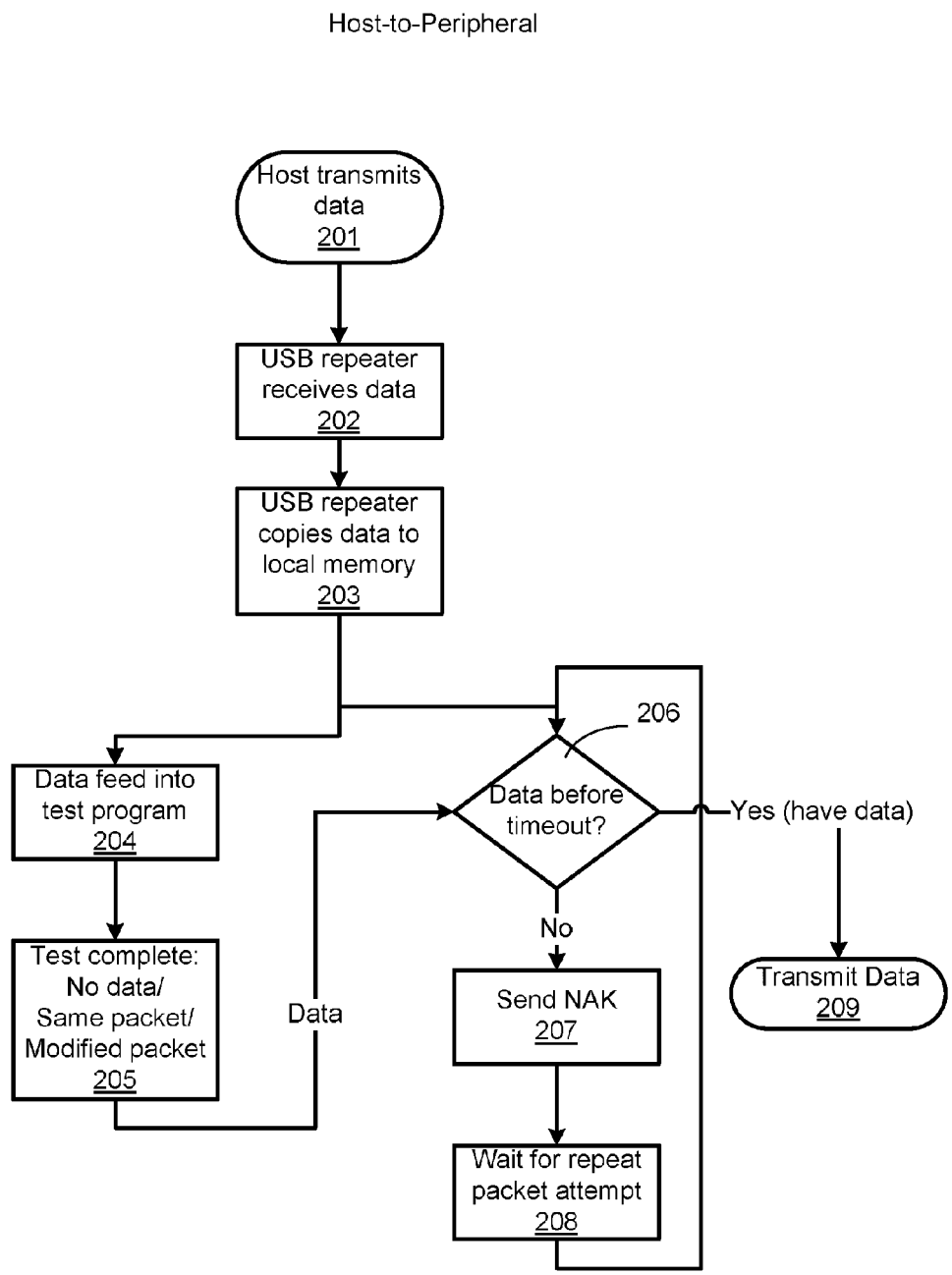
FIG. 2 is a block diagram, of a further embodiment of the present invention, with details of implementation of the preservation process 104 of FIG. 1 in communication processes from a host computing device to a peripheral device.

FIG. 2 is a block diagram, of a further embodiment of the present invention, with details of implementation of the preservation process 104 of FIG. 1, in communication processes from a host computing device to a peripheral device. In FIG. 2, under process 201, the host computing device transmits data over a Universal Serial Bus (USB) to a device we here called a "USB repeater," which implements the processes of FIG. 1. In process 202, the USB repeater receives the data. In process 203, the repeater stores the received data in its local memory. In process 204, the data is fed to a test program, which, in process 205, analyzes the data in accordance with processes 103, 105, and 106 of FIG. 1. As discussed in connection with FIG. 1, data is forwarded in process 107 if there has not been a determination of a security risk in process 105 following analysis in process 103. If there is a determination of a security risk, then either no data or a modified packet is issued in process 205.

In addition, the embodiment of FIG. 2 includes a preservation process. More particularly, processes 103 and 105 of FIG. 1 may require some time to be completed, and a preservation process 104 is implemented in the embodiment of FIG. 2 to provide this time. In decision process 206, there is a determination whether data has been made available by process 205 before timeout, and if data is thus available, then in process 209 data is transmitted to the peripheral. If there is no data to transmit from the process 205, then program logic operates in process 207 to send a negative-acknowledge to the host and in process 208 to wait for a repeated attempt to send the packet by the host. This exemplary preservation process precludes termination of inter-device communication between the host computing device and the peripheral device.

Figure 3:
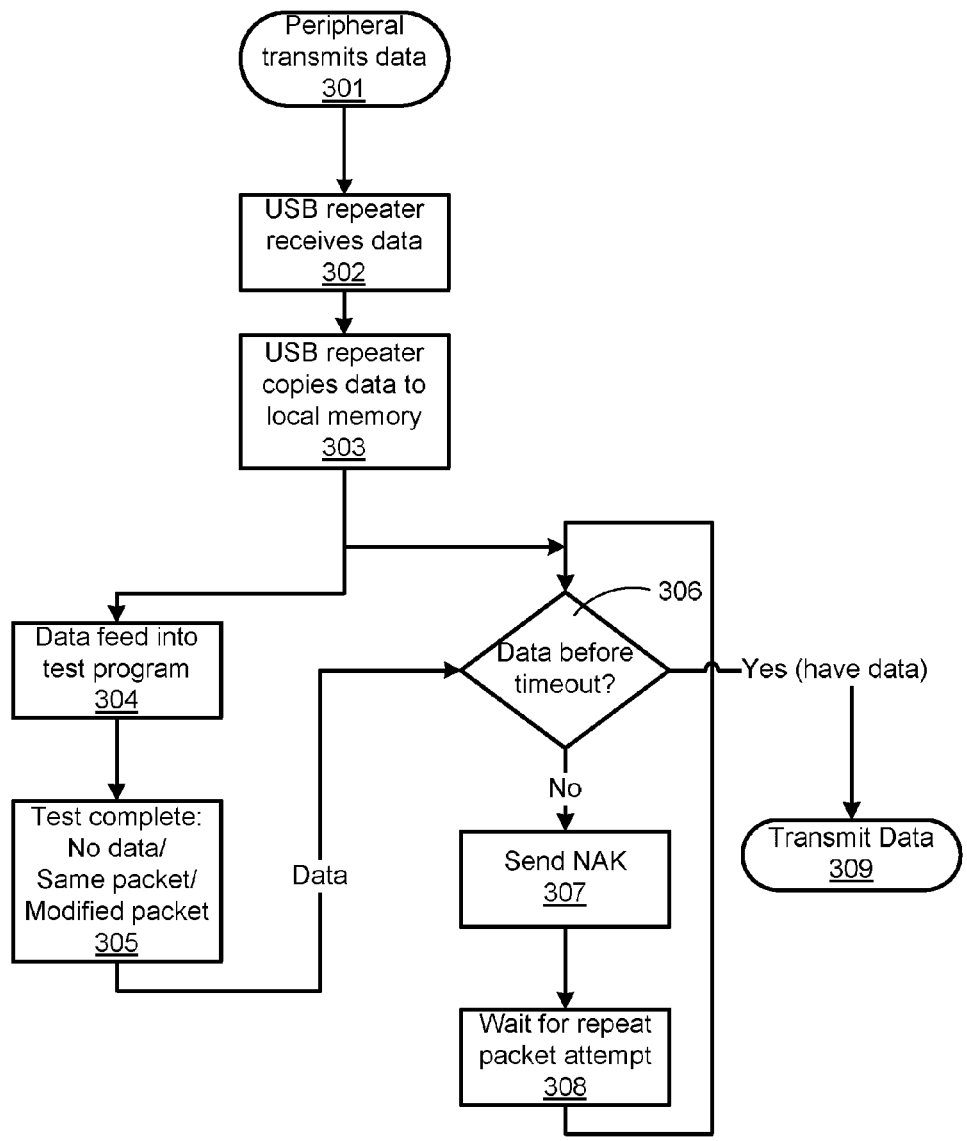
FIG. 3 is a block diagram, of the embodiment of FIG. 2, with details of implementation of the preservation process 104 of FIG. 1 in communication processes from the peripheral device to the host computing device.

FIG. 3 is a block diagram, of the embodiment of FIG. 2, with details of implementation of the preservation process 104 of FIG. 1, in communication processes from the peripheral device to the host computing device. The processes represented are symmetric to those in FIG. 2. The data is received from the peripheral device instead of the host computing device. Thus in FIG. 3, under process 301, the peripheral device transmits data over a Universal Serial Bus (USB) to the USB repeater, which (as previously stated) implements the processes of FIG. 1. In process 302, the USB repeater receives the data. In process 303, the repeater stores the received data in its local memory. In process 304, the data is fed to a test program, which, in process 305, analyzes the data in accordance with processes 103, 105, and 106 of FIG. 1. As discussed in connection with FIG. 1, data is forwarded in process 107 if there has not been a determination of a security risk in process 105 following analysis in process 103. In a manner analogous to FIG. 2, if there is a determination of a security risk, then either no data or a modified packet is issued in process 305.

As stated in connection with the embodiment of FIG. 2, the embodiment of FIG. 3 similarly includes a preservation process. More particularly, processes 103 and 105 of FIG. 1 may require some time to be completed, and a preservation process 104 is implemented in the embodiment of FIG. 3 to provide this time. In decision process 306, there is a determination whether data has been made available by process 305 before timeout, and if data is thus available, then in process 309 data is transmitted to the host computing device. If there is no data to transmit from the process 305, then program logic operates in process 307 to send a negative-acknowledge to the peripheral and in process 308 to wait for a repeated attempt to send the packet by the peripheral. As in FIG. 2, this exemplary preservation process precludes termination of inter-device communication between the host computing device and the peripheral device.

Figure 4:
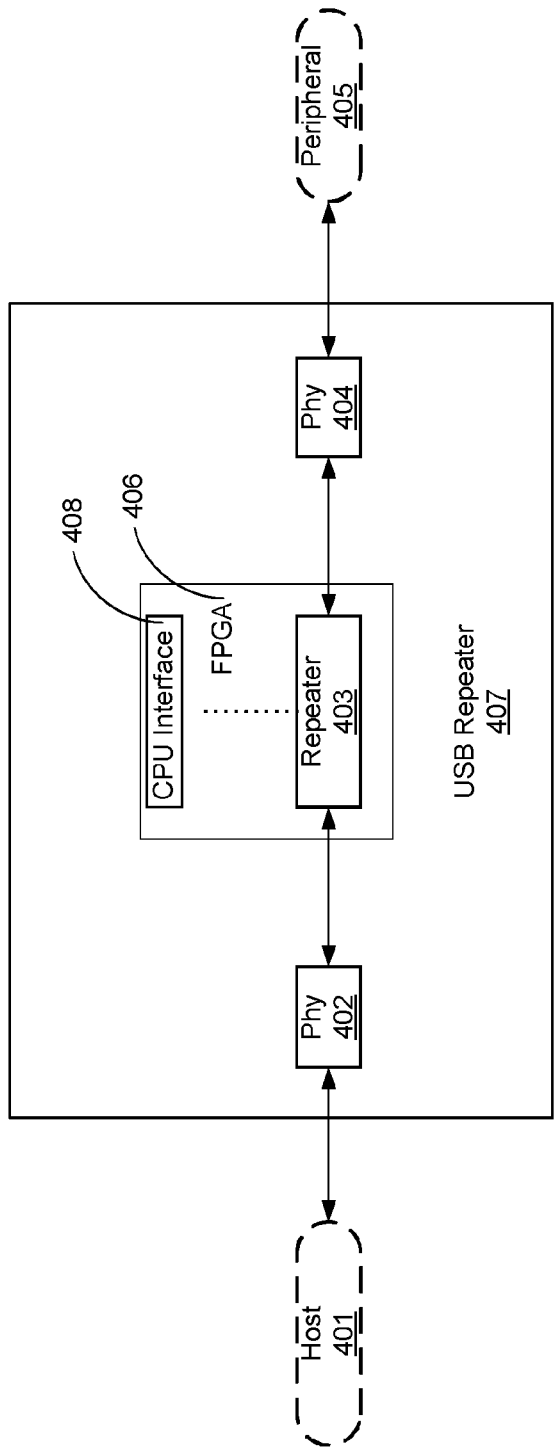
FIG. 4 is a block diagram of the architecture of a hardware embodiment of the present invention.

FIG. 4 is a block diagram of the architecture of a hardware embodiment of the present invention. The hardware can be viewed as a hardware USB repeater 407 that is placed between the host computing device 401 and the peripheral device 405. The embodiment shown in FIG. 4 includes three modules. The host computing device interface is through the physical layer 402. The peripheral device interface is through the physical layer 404. Physical layers 402 and 404 are in communication with a main module 406 which includes a CPU interface 408 and a repeater 403. Module 406, which may be embodied in a field-programmable gate array (FPGA), implements the processes described above in connection with FIGS. 1-3, and as further described below. In an alternative embodiment, items 402, 406, and 404 may be integrated into a single module.

Figure 5:
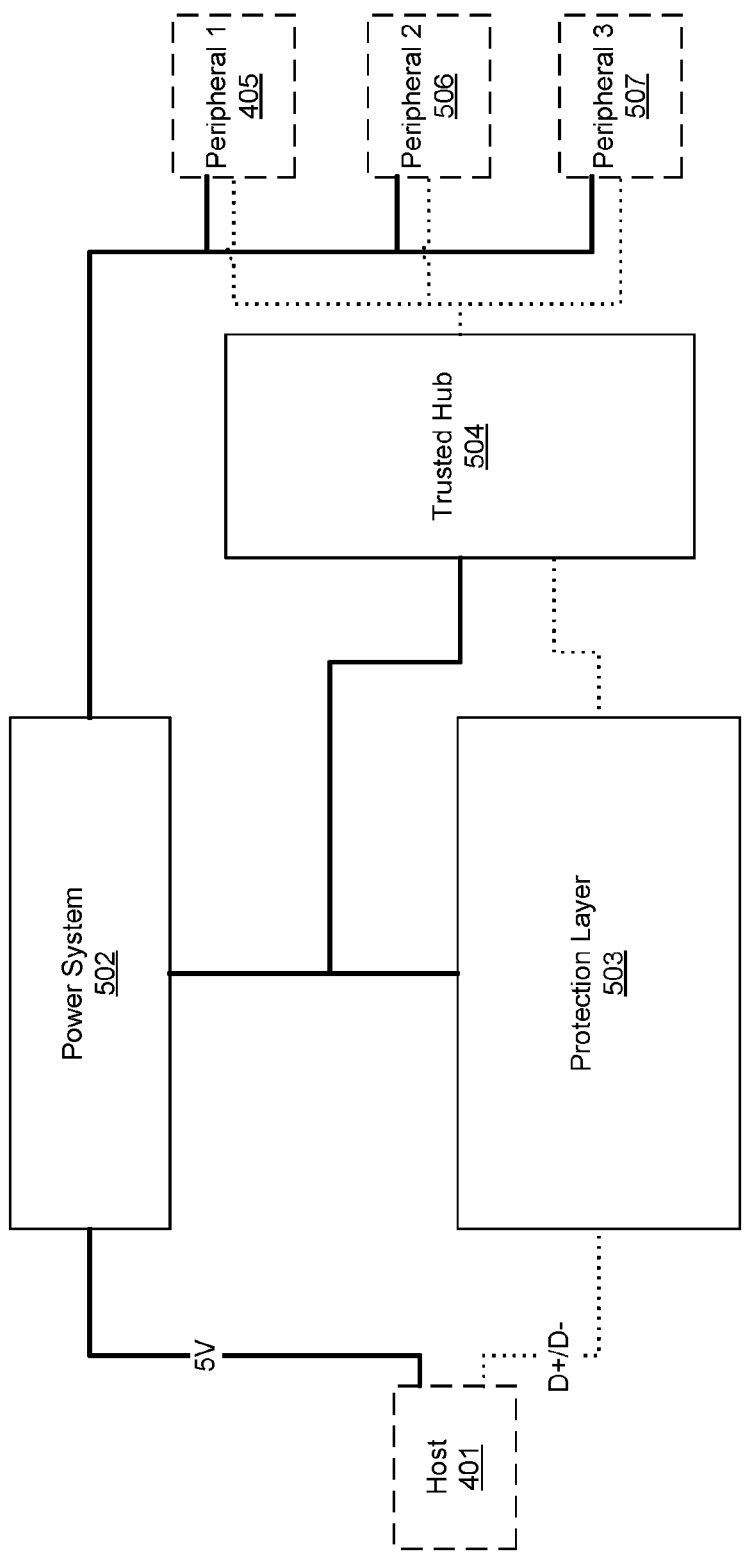
FIG. 5 is a block diagram of a hardware embodiment of the present invention providing further details for implementation of the embodiment of FIG. 4.

FIG. 5 is a block diagram of a hardware embodiment of the present invention providing further details for implementation of the embodiment of FIG. 4. The embodiment of FIG. 5 includes three modules: a power module, a data module, and a trusted hub, which are in communication with each other and with the host computing device 401 and peripheral devices 405, 506, and 507. One embodiment of the power module is the Power System 502. One embodiment of the data module is the Protection Layer 503. One embodiment of the hub module is the Trusted Hub 504. The Protection Layer 503 may optionally include an isolation arrangement that electrically isolates the data lines. The isolation arrangement may be implemented by one or more of optical isolation, mechanical relays, and electrical buffering, to add a method of separation in the data lines.

Figure 6:
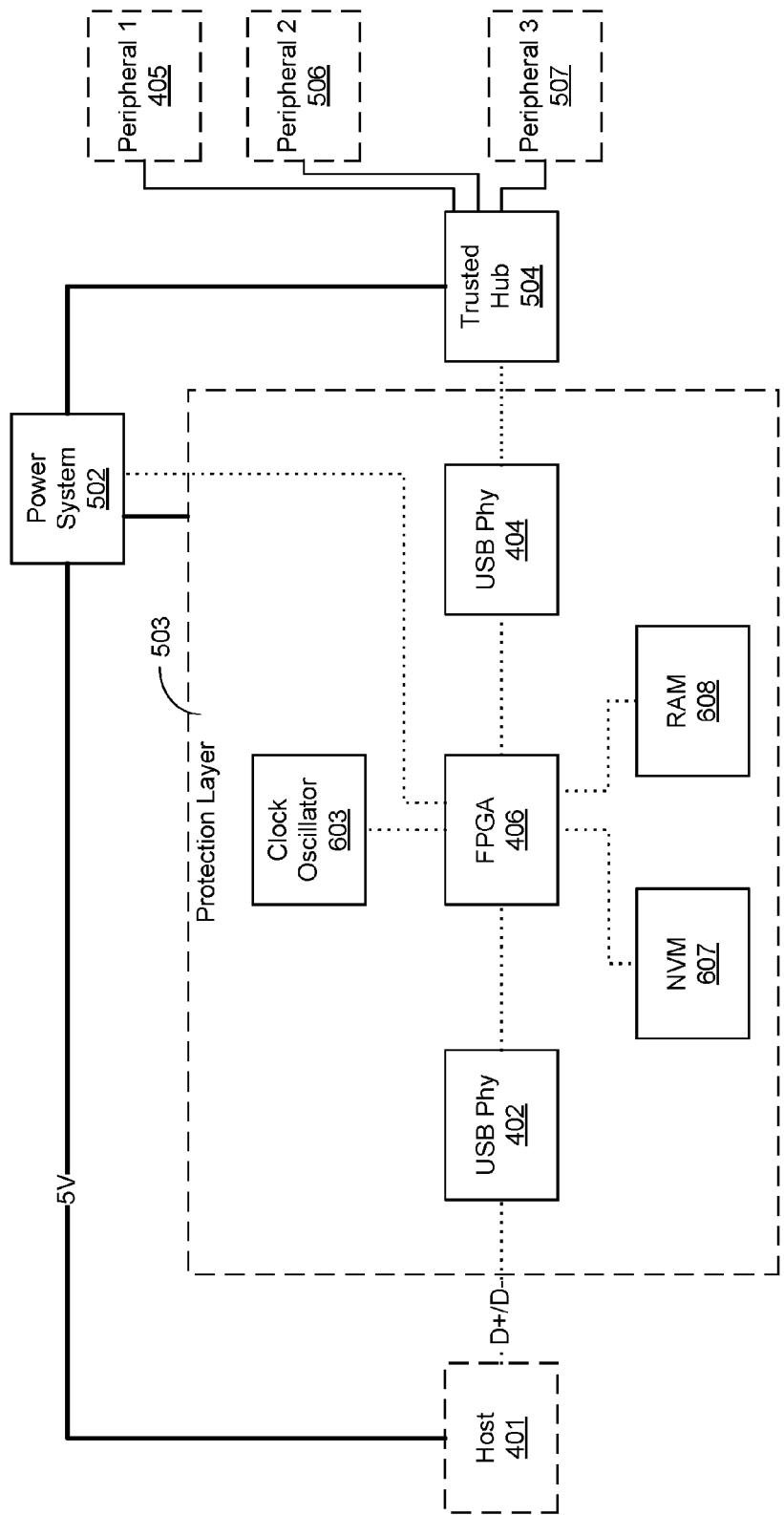
FIG. 6 is block diagram providing detail of the data module of the embodiment of FIG. 5.

FIG. 6 is block diagram providing detail of the data module of the embodiment of FIG. 5. In the embodiment shown in FIG. 6, the data module is a protection layer 503 that is implemented with USB Physical Layers 402 and 404 in communication with a main module FPGA 406. A non-volatile memory 607 and random access memory (RAM) 608 also are coupled to FPGA 406, along with clock oscillator module 603.

Figure 7:
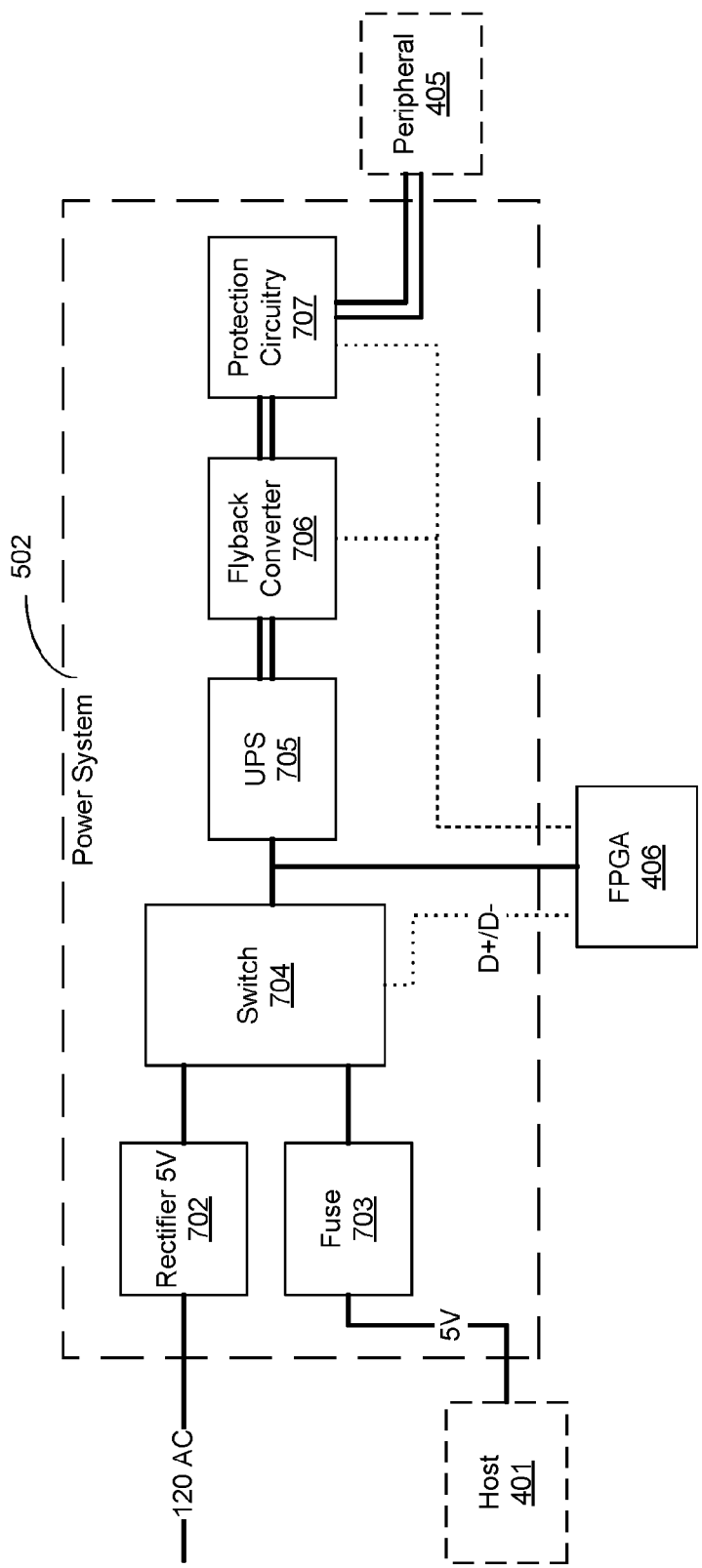
FIG. 7 is block diagram providing detail of the power module of the embodiment of FIG. 5.

FIG. 7 is block diagram providing detail of the power module of the embodiment of FIG. 5. The power module is coupled to the host computing device 401 and the peripheral device 405. A switch 704, which is typically electronically operated, selectively provides power derived either from a line voltage though rectifier 702 or from the host computing device power protected by a fuse 703. Line voltage may be, for example, 120 V AC. This power supplies the FPGA 406 and an uninterruptible power supply 705, which, through flyback converter 706 and protection circuitry 707, supplies power to the peripheral 405.

In further related embodiments, the power module contains internal active clamp circuitry that provides a dedicated power system defense to protect the host computing device and the peripheral device from power disruptions. The power system defense electrically isolates the 5V and ground power lines. The electrical isolation protects the host computing device and the peripheral device from conditions such as over-voltage or over-current. In this embodiment, an attempt by the host computing device or peripheral device to pull more current than is allowed triggers a protection process, which performs at least one of the following countermeasures: locking out the port in question, notifying the user of a violation of specification, requesting that the user physically disconnect the device in violation, and re-enabling the connection. In some embodiments a super-capacitor or battery technology may be used to provide power isolation in the event of a power surge.

Figure 8:
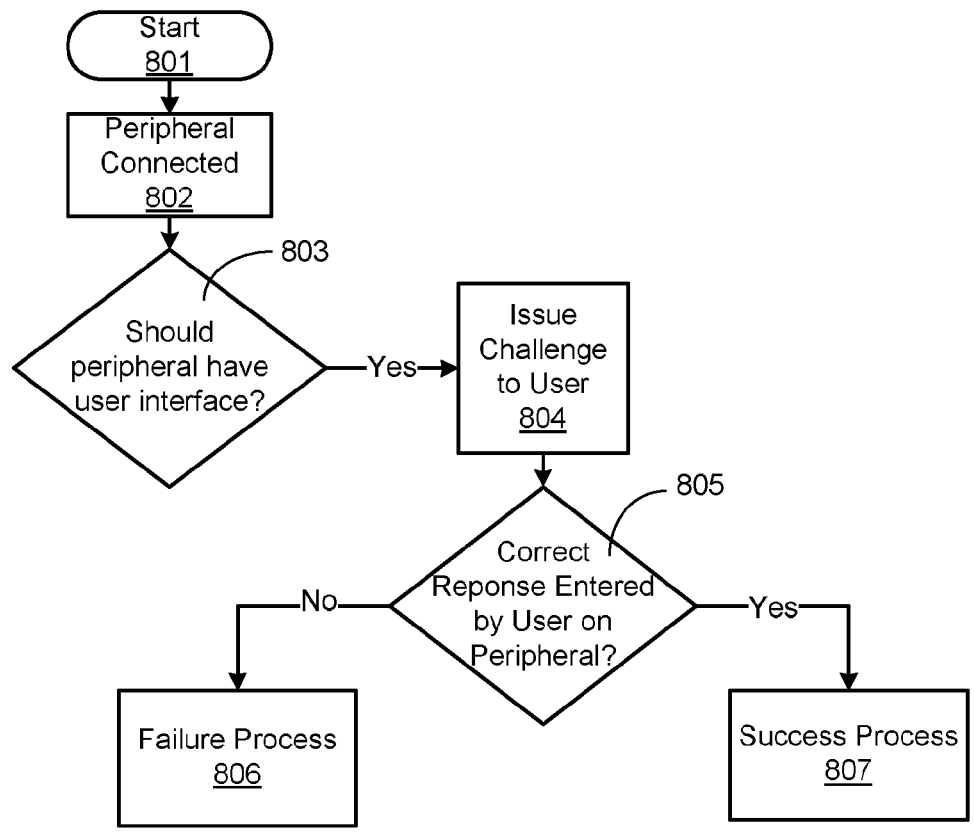
FIG. 8 is a block diagram showing logical flow of peripheral authentication processes in accordance with an embodiment of the present invention.

FIG. 8 is a block diagram showing logical flow of peripheral authentication processes in accordance with an embodiment of the present invention. The illustrated process starts at item 801. At item 802, the peripheral is connected and data characterizing a nature of the peripheral is received from the peripheral device. In decision process 803, if the nature of the peripheral includes having a user interface, an authentication process issues a challenge to the user 804. According to some embodiments the challenge may be issued via a display located on one of the host computing device, security module, peripheral device, and external module. Alternatively, or in addition, the challenge may be an auditory or haptic challenge. Furthermore, the host computing device and the peripheral device may be prevented from having access to the challenge in order to add security. One embodiment of presenting the user a challenge in such a way that the host computing device and the peripheral device may be prevented from having access is through an external screen or speaker that is controlled by additional computational abilities of the security module. Such computational abilities may not necessarily interact in any other way with either the host or the peripheral. In decision process 805, the data received from the peripheral device is analyzed. In the illustrated embodiment, a failure process 806 or a success process 807 is implemented depending on the user response.

Figure 9:
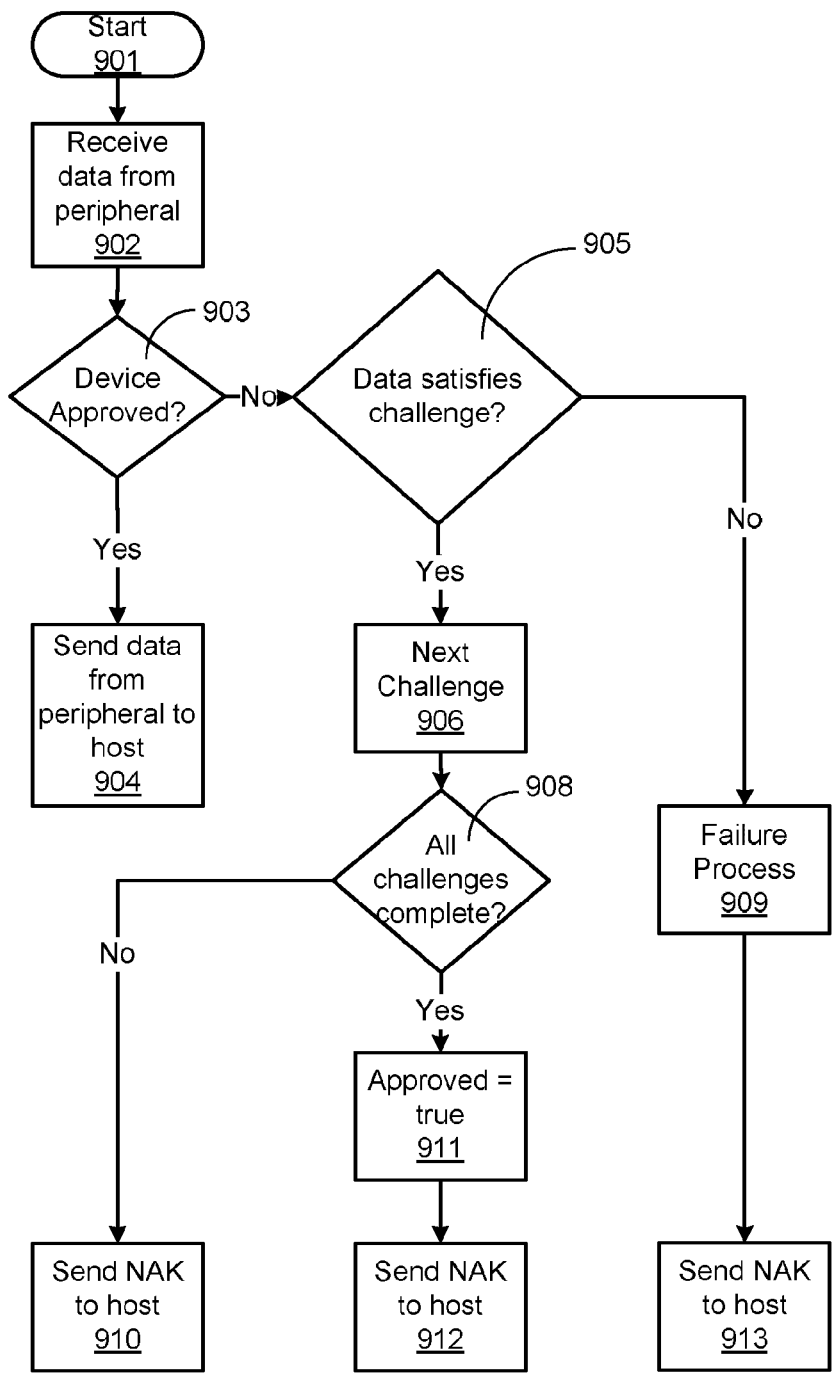
FIG. 9 is a block diagram providing further detail of the processes illustrated in FIG. 8.

FIG. 9 is a block diagram providing further detail of the processes illustrated in FIG. 8. The illustrated process starts at item 901. At item 902, data characterizing the nature of the peripheral device is received from the peripheral device. In process 903, there is a test of whether the device is approved based on the data. If the device is approved in process 903, then data is sent in process 904 from the peripheral device to the host device. If the device is not approved in process 903, then a challenge process 905 is performed requiring a user response to be entered on the peripheral device. The data received from the peripheral device purporting to be attributable to the user response is analyzed. If the data does not satisfy the challenge process 905, failure process 909 is initiated, followed by a negative-acknowledge sent to the host in process 913. If the data received from the peripheral device satisfies the challenge process 905, then a further challenge is presented in process 906. In process 908, there is testing to determine whether the challenge processes have been completed, and if not completed, then in process 910, a negative-acknowledge is sent to the host. If in process 908 it is determined that the challenge processes have been completed, then in process 911 there is issued device approval, and a negative-acknowledge is sent to the host in process 912.

Figure 10:
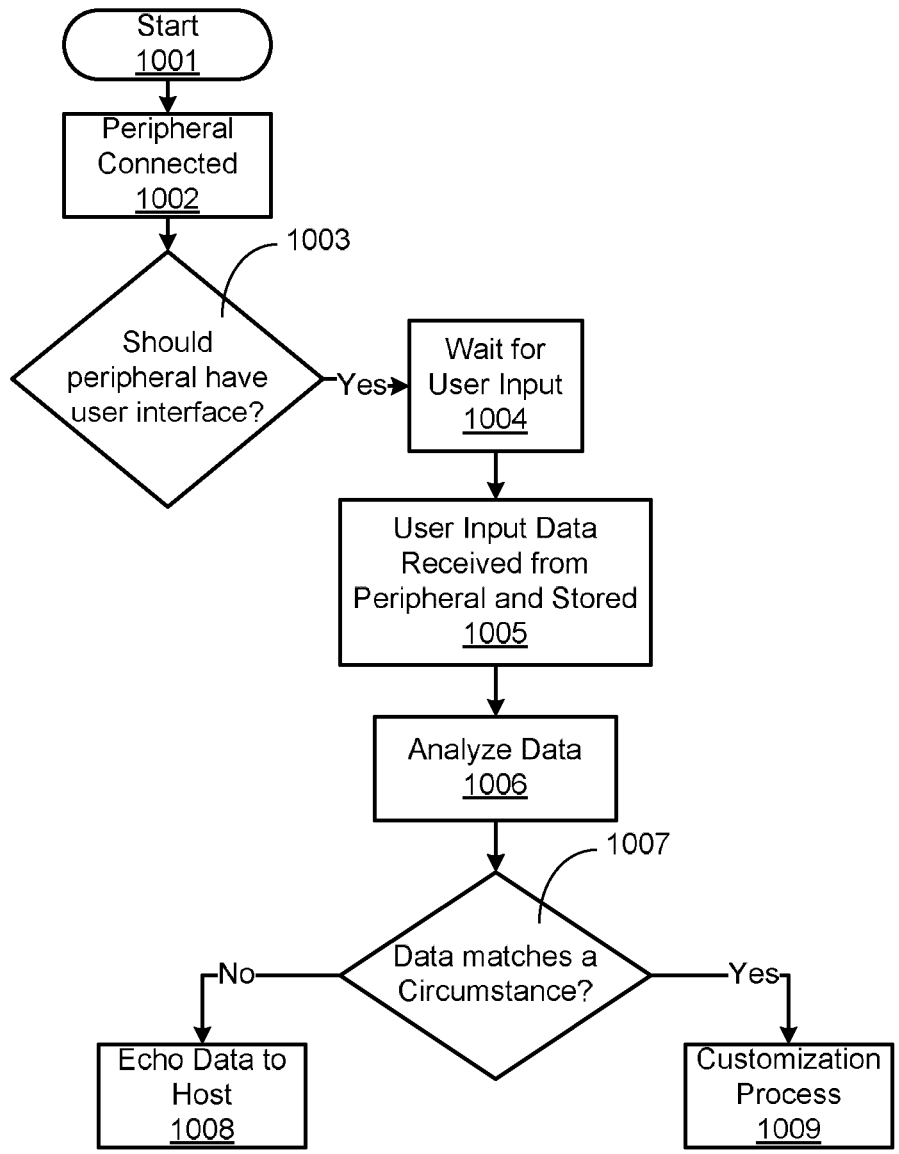
FIG. 10 is a block diagram showing logical flow associated with input customization in accordance with an embodiment of the present invention.

FIG. 10 is a block diagram showing logical flow associated with input customization in accordance with an embodiment of the present invention. The process starts at item 1001. In process 1002, the peripheral is connected and data is received from the peripheral device characterizing its nature. If the nature of the device is determined to have a user interface process 1003, then in process 1004, the program logic waits for user input. In process 1005, user input data is received from the peripheral device purporting to be attributable to user input and stored. Then in process 1006, the stored data is analyzed to identify a circumstance defined by an identification rule. In process 1007, there is a determination whether the data matches a circumstance defined by the rule. If the determination is that there is a match, then a customization process 1009 defined by a customization rule is implemented and program flow ends in process 1011. If the determination in process 1007 is that there is not a match, then in process 1008, the data is forwarded to the host computing device and program flow ends. In one embodiment, the circumstance may be to cause disallowance of or prohibit certain keyboard or mouse functions, such as print screen, copy/paste, right click, or the insert key. In addition, the circumstance may be tied to software in such a way that certain functions are disallowed when certain software is running on the host computing device, peripheral device, or networks of either one. In yet another embodiment, data such as key strokes is logged to detect certain combinations of key strokes. A protection process may be implemented if a harmful combination of key strokes is received, which could, for example, block the harmful communication and/or notify the user. An emergency process could be implemented if a specific combination of key strokes, or a "panic keystroke," is received. In the emergency process, for example, normal echoing of key strokes may be inhibited and there may be implemented processes either on the security module itself or on the host computing device or the peripheral device or on the networks of either. Some embodiments include triggering a silent alarm, displaying a "blue screen," accessing the Internet, self destructing, or deleting data on one of the security module, host computing device, peripheral device, or networks of either.

Figure 11:
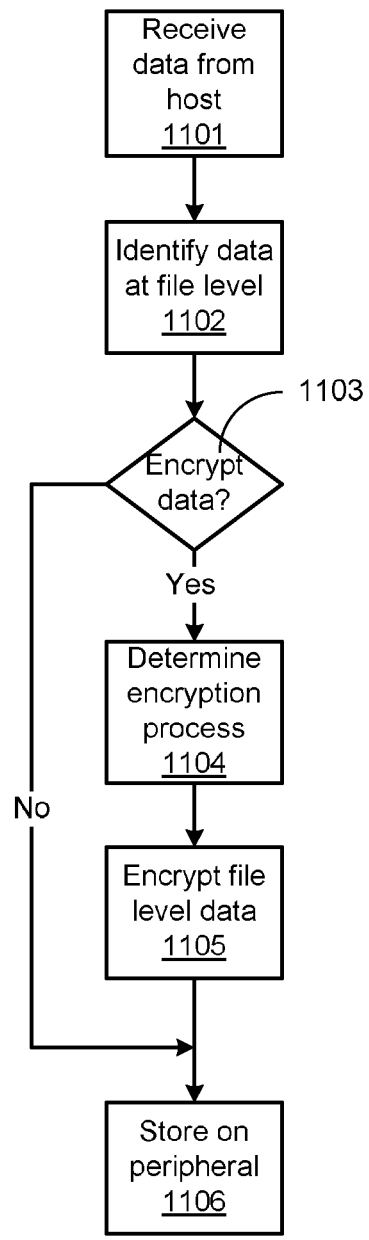
FIG. 11 is a block diagram showing logical flow associated with file level encryption in accordance with an embodiment of the present invention.

FIG. 11 is a block diagram showing logical flow associated with file level encryption in accordance with an embodiment of the present invention. Data is first received from the host computing device in process 1101. In process 1102, there is then implemented identifying data at a file level being subject to a write command to the peripheral device. In process 1103, there is a determination whether the data is to be encrypted according to a rule. If process 1103 leads to a determination to encrypt the data, then in process 1104 an encryption process is determined. In process 1105, the file level data is subject to the encryption process, which may be distinct for each file. If in process 1103, there is a determination not to encrypt the data, then no encryption steps are followed. Finally in process 1106, the data is stored, either encrypted or not encrypted, on the peripheral device. Since in one embodiment the peripheral device may be part of the host computing device, the encrypted data may be stored on a hard drive of the host computing device. In one embodiment, the encryption process is also dependent on the location or address where the data is stored after encrypting. The encryption process may also be configured in relation to a key derived from a user password as well as a pseudorandom number, in such a manner that the key changes with every file that is encrypted. In one embodiment, advanced hashing search algorithms are implemented to meet timing requirements.

Figure 12:
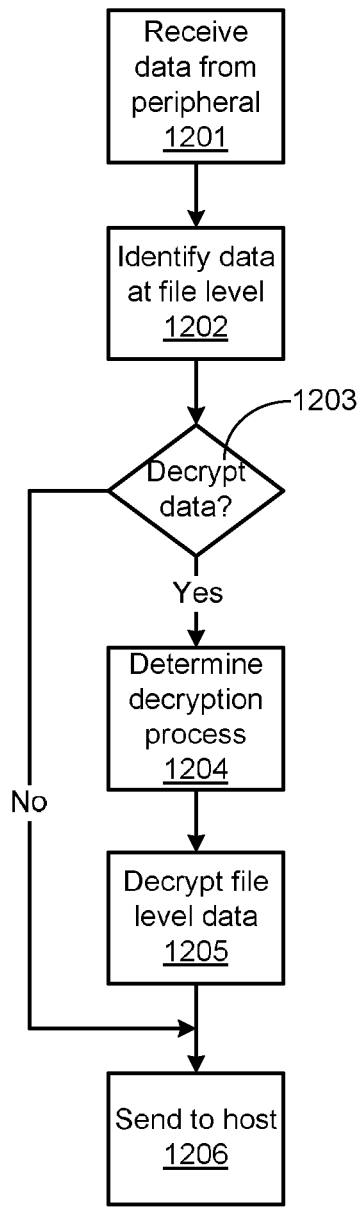
FIG. 12 is a block diagram showing logical flow associated with file level decryption in accordance with an embodiment of the present invention.

FIG. 12 is a block diagram showing logical flow associated with file level decryption in accordance with an embodiment of the present invention. Data is first received from the peripheral device in process 1201. Next, in process 1202 there is implemented identifying data at a file level being subject to a read command to the host computing device. In process 1203, there is a determination whether to decrypt the data according to a rule. If there is a determination to decrypt the data, then in process 1204 the decryption process is determined. Next in process 1205 the file level data is subject to the decryption process, which may be distinct for each file. If in process 1203, there is a determination not to decrypt the data, then no decryption steps are followed. Finally in process 1206, the data is stored, either decrypted or not decrypted, on the host computing device. In one embodiment, a rule defines which host computing devices are allowed to decrypt certain files or types of files.

Figure 13:
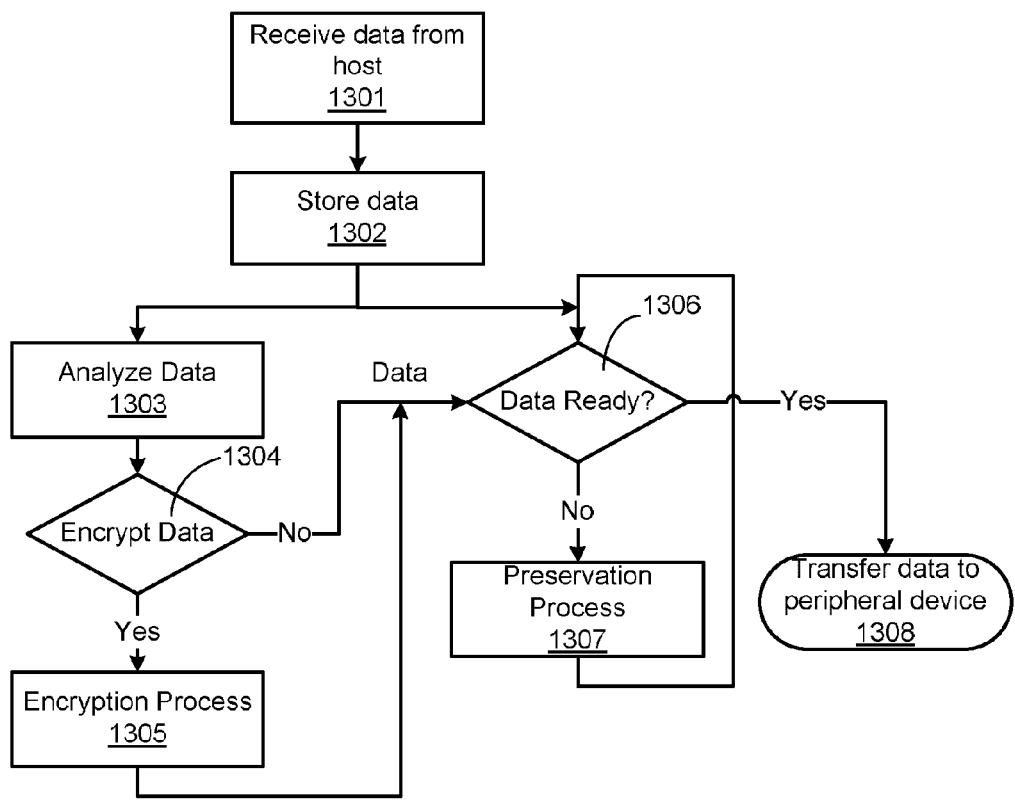
FIG. 13 is a block diagram showing logical flow associated with transmission encryption in accordance with an embodiment of the present invention.

FIG. 13 is a block diagram showing logical flow associated with transmission encryption in accordance with an embodiment of the present invention. In process 1301, data is first received from the host computing device and subsequently stored in process 1302. Following this, two sub-processes are run in parallel. In sub-process 1303, the stored data is analyzed to determine an analysis of what part thereof, if any, to encrypt. In process 1304, based on the analysis, there is a determination whether to encrypt the data. If in process 1304, there is a determination to encrypt the data, then an encryption process 1305 is implemented in accordance with the analysis for forwarding to the peripheral device (following a data readiness test to be described) in process 1308. If in process 1304, there is a determination not to encrypt the data, then the unencrypted data is transferred to the peripheral device (again following the data readiness test to be described) in process 1308. In sub-process 1306, data readiness from blocks 1304 and 1305 is tested. If the data is determined to be ready, data is transferred to the peripheral device in process 1308, either encrypted or unencrypted. If data is determined to be not ready, a preservation process 1307 (such as previously described in connection with FIGS. 2 and 3) is implemented that precludes inter-device communication termination.

Figure 14:
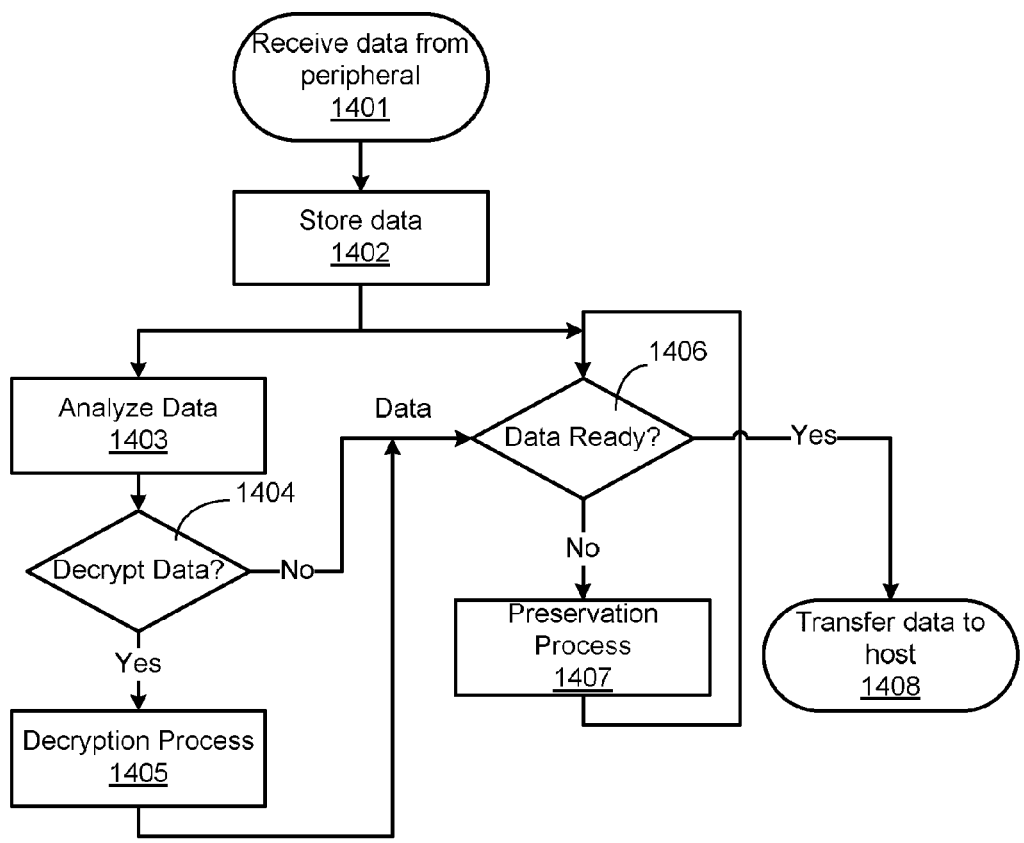
FIG. 14 is a block diagram showing logical flow associated with transmission decryption in accordance with an embodiment of the present invention.

FIG. 14 is a block diagram showing logical flow associated with transmission decryption in accordance with an embodiment of the present invention. Data is first received from the peripheral device in process 1401 and subsequently stored in process 1402. Following this, two sub-processes are run in parallel. In sub-process 1403, the stored data is analyzed to determine an analysis of what part thereof, if any, to decrypt. If in process 1403, there is a determination to decrypt the data, then a decryption process 1405 is implemented in accordance with the analysis, and decrypted data is transferred to the host computing device in process 1408. If there is a determination in process 1404 not to decrypt the data, then the encrypted data is transferred to the host computing device in process 1408. In the other sub-process 1406, data readiness from blocks 1404 and 1405 is tested. If the data is determined to be ready, data is transferred to the host computing device in process 1408, either decrypted or encrypted. If data is determined not to be ready, a preservation process 1407 is implemented that precludes inter-device communication termination.

Figure 15:
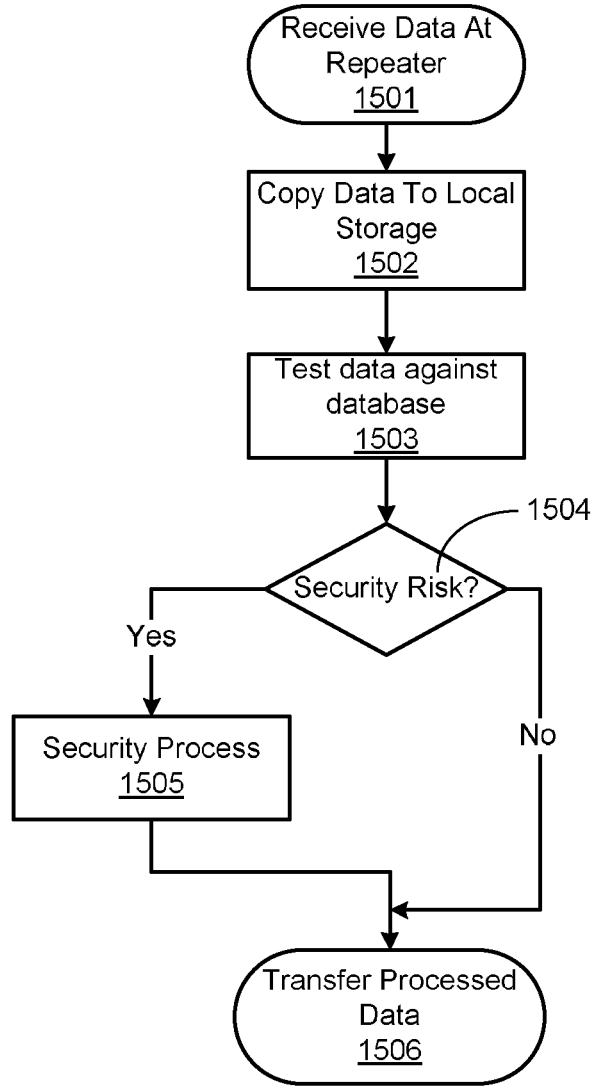
FIG. 15 is a block diagram showing logical flow associated with attack identification via a database in accordance with an embodiment of the present invention.

FIG. 15 is a block diagram showing logical flow associated with attack fingerprinting in accordance with an embodiment of the present invention. In process 1501, data is received from one of the peripheral device and the host computing device. In process 1502, the received data is stored. In addition, process 1503 implements an analyzing process that tests received data against a database to identify a circumstance posing a security risk. In one embodiment, a hash search algorithm is used to search the database. In one embodiment, the database contains attack patterns and/or fingerprints of known and/or anticipated attacks. This database can be updated, for example directly or through the host computing device or peripheral device. In process 1504, there is a determination whether the analyzing process has identified a circumstance posing a security risk. If there is not a determination of a security risk in process 1504, then in process 1506, the data is forwarded to the other of the peripheral device and the host computing device. If however, in process 1504, there is a determination of a circumstance posing a security risk, then a security process 1505 defined by a rule is performed. In one embodiment, the security process may send modified data to the other of the peripheral device and the host computing device. In another embodiment, the security process may include at least one of blocking the data, logging the attack, and notifying the user. The security process may also include transmitting information regarding the attack to a centralized location. The security process may also use information regarding the attack to update the database and to predict future attacks.

Figure 26:
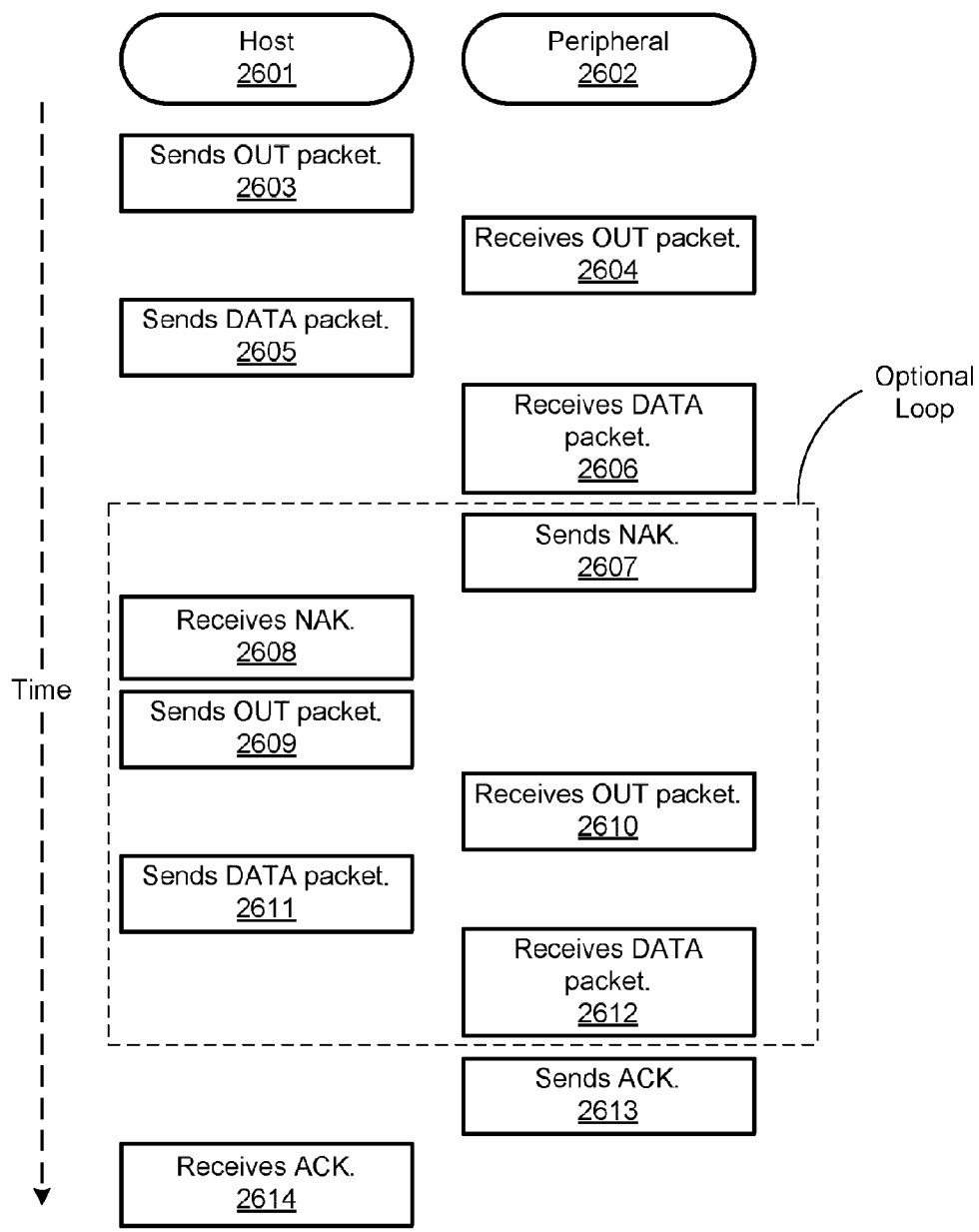
FIG. 26 is a sequence diagram of logical processes performed in a host and one or more peripheral devices, according to the prior art.

FIG. 26 is a sequence diagram of logical processes performed in a host and one or more peripheral devices, according to the prior art. Time increases moving downward as the arrow indicates. In this sequence, the Peripheral 1, 2602, is coupled to the host, 2601 via USB. In process 2603, the host, 2601, sends an OUT token packet to the peripheral. The peripheral, 2602, receives the packet in process 2604. The host then sends a DATA packet in process 2605, which is received by the peripheral in process 2606. The peripheral may optionally send a negative-acknowledge, as indicated in process 2607. If this occurs, the host will then first receive this negative-acknowledge in 2608 and then re-attempt the transmission of the OUT and DATA packets sometime later. The host retransmits the OUT packet in process 2609, which is received by the peripheral in process 2610. The host will then retransmit the DATA packet in process 2611 which is received by the peripheral in process 2612. At this point, the peripheral may issue another negative-acknowledge packet to request another re-transmission, and the loop would repeat. However, the peripheral will at some point respond with an acknowledge, as indicated in process 2613, which will be received by the host in process 2614, which ends the transaction.

Figure 27:
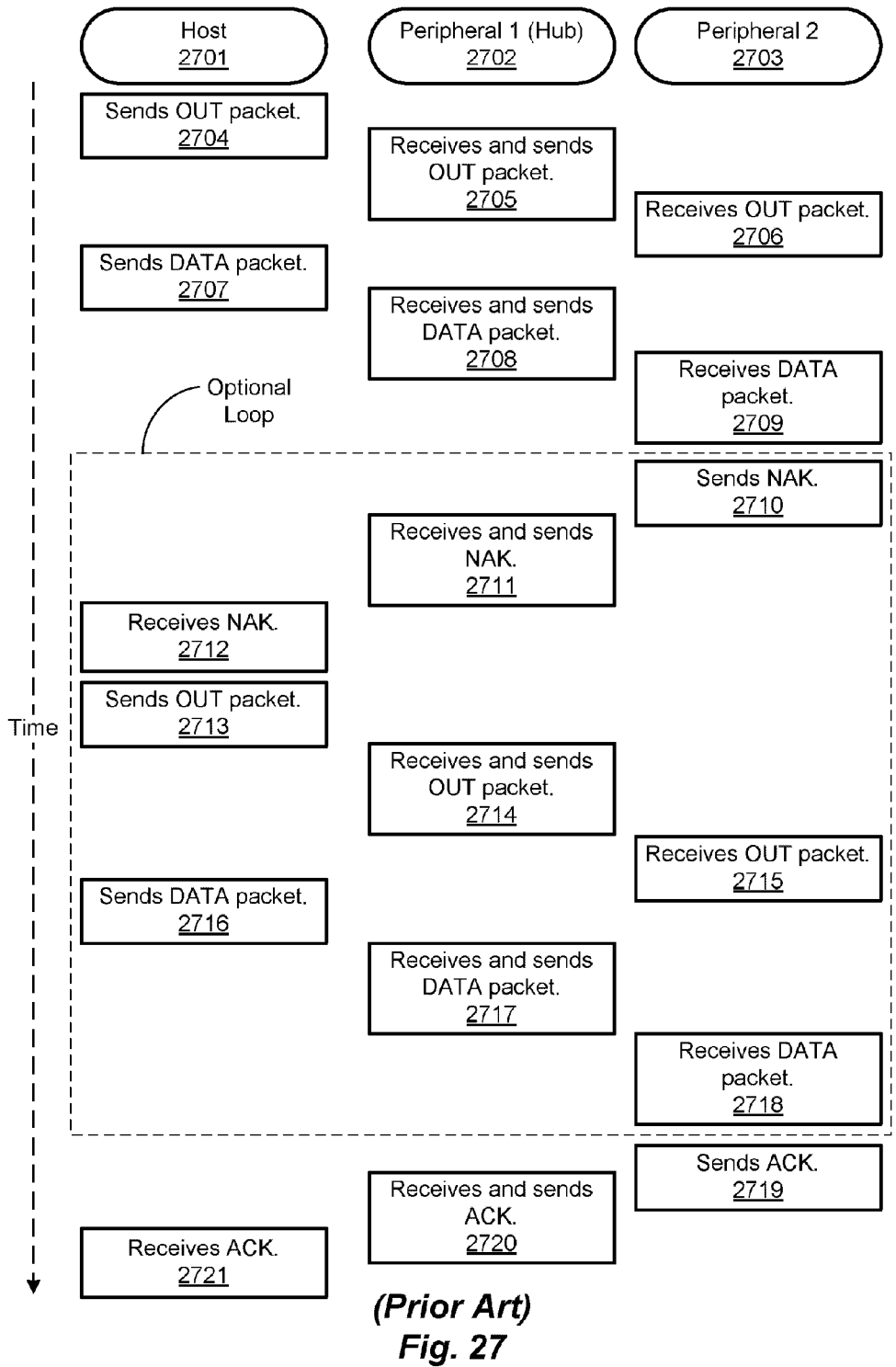
FIG. 27 is a sequence diagram of the logical processes performed in a host and one or more peripheral devices, according to the prior art.

FIG. 27 is a sequence diagram of the logical processes performed in a host and one or more peripheral devices, according to the prior art. Time increases moving downward as the arrow indicates. In this sequence, the Peripheral 1, 2702, may be a hub and is coupled to the host 2701. Peripheral 2, 2703, is coupled to Peripheral 1, 2702. In the first process, 2704, the host, 2701, sends an OUT packet addressed to peripheral 2. This signal is received by peripheral 1, 2702, and retransmitted to peripheral 2, 2703, in process 2705. The peripheral then receives this signal in process 2706. Next, the host sends a DATA packet in process 2707. Peripheral 1 receives and re-transmits this packet in process 2708. The packet is received by the peripheral in process 2709. At this point, the peripheral may optionally respond with a negative-acknowledge in process 2710. Reasons that a peripheral would send a negative-acknowledge may include the peripheral device not being ready to receive data, as well as the transmitted data being corrupted or otherwise needing to be resent. If this occurs, peripheral 1 will receive this negative-acknowledge and transmit it to the host in process 2711. The host will receive this negative-acknowledge in process 2712. Upon receipt of a negative-acknowledge, the host will retransmit the initial OUT packet sometime later in process 2713. The peripheral 1 will receive and retransmit this signal in process 2714, and the peripheral will receive the OUT packet in process 2715. The host will then re-transmit a DATA packet in process 2716, which is received by peripheral 1 and retransmitted in process 2717. The peripheral receives this data in process 2718. At this point, the peripheral may opt to respond with another negative-acknowledge. If this occurs, the loop repeats. However, the peripheral will at some point respond with an acknowledge as indicated in 2719. Peripheral 1 will receive and retransmit this signal as indicated in process 2720. Finally, the host will receive this data in process 2721. This sequence describes a transaction that occurs in the USB protocol when a hub is placed between the host and a peripheral.

Figure 28:
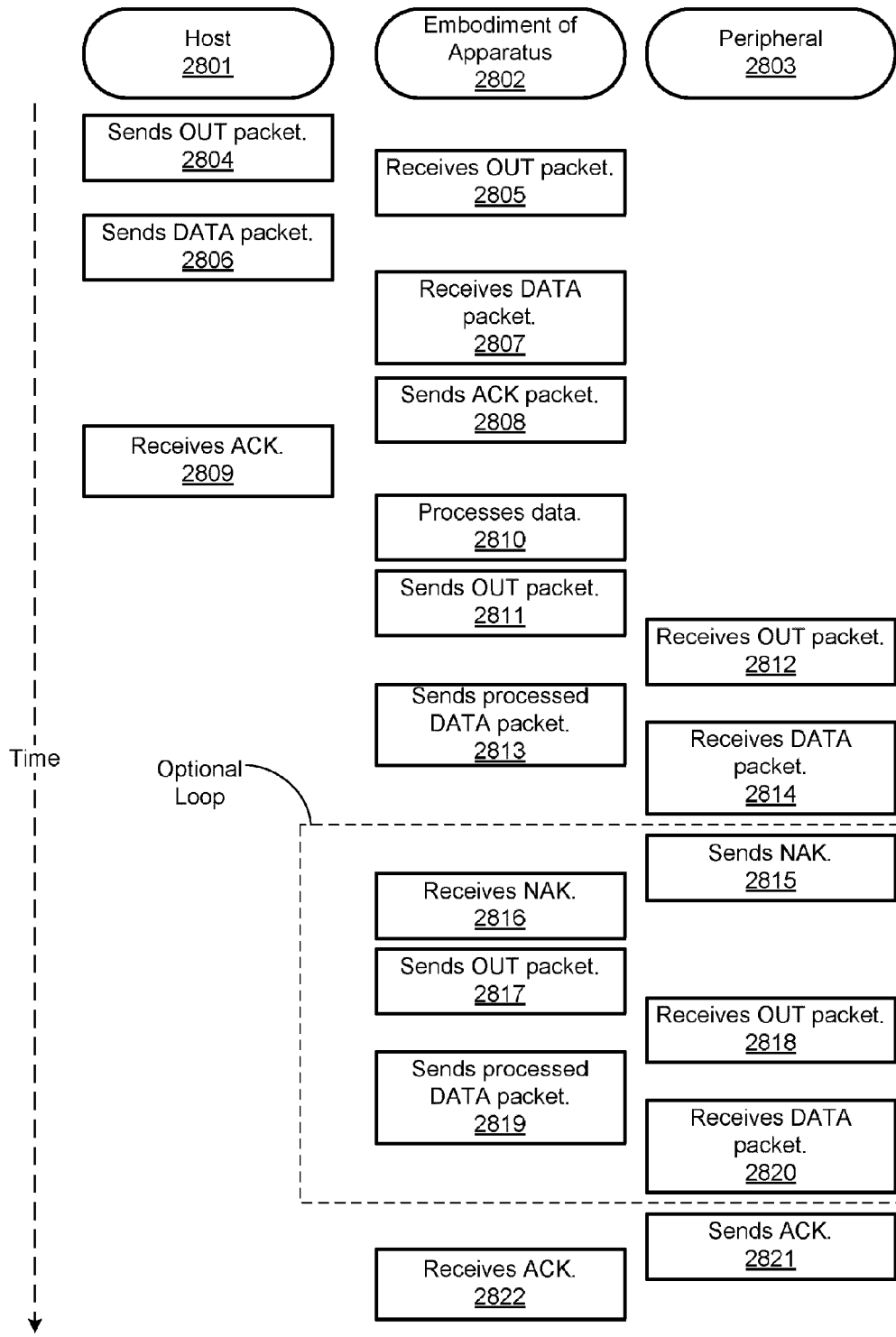
FIG. 28 is a sequence diagram of logical processes performed in accordance with an embodiment of the present invention.
Figure 29:
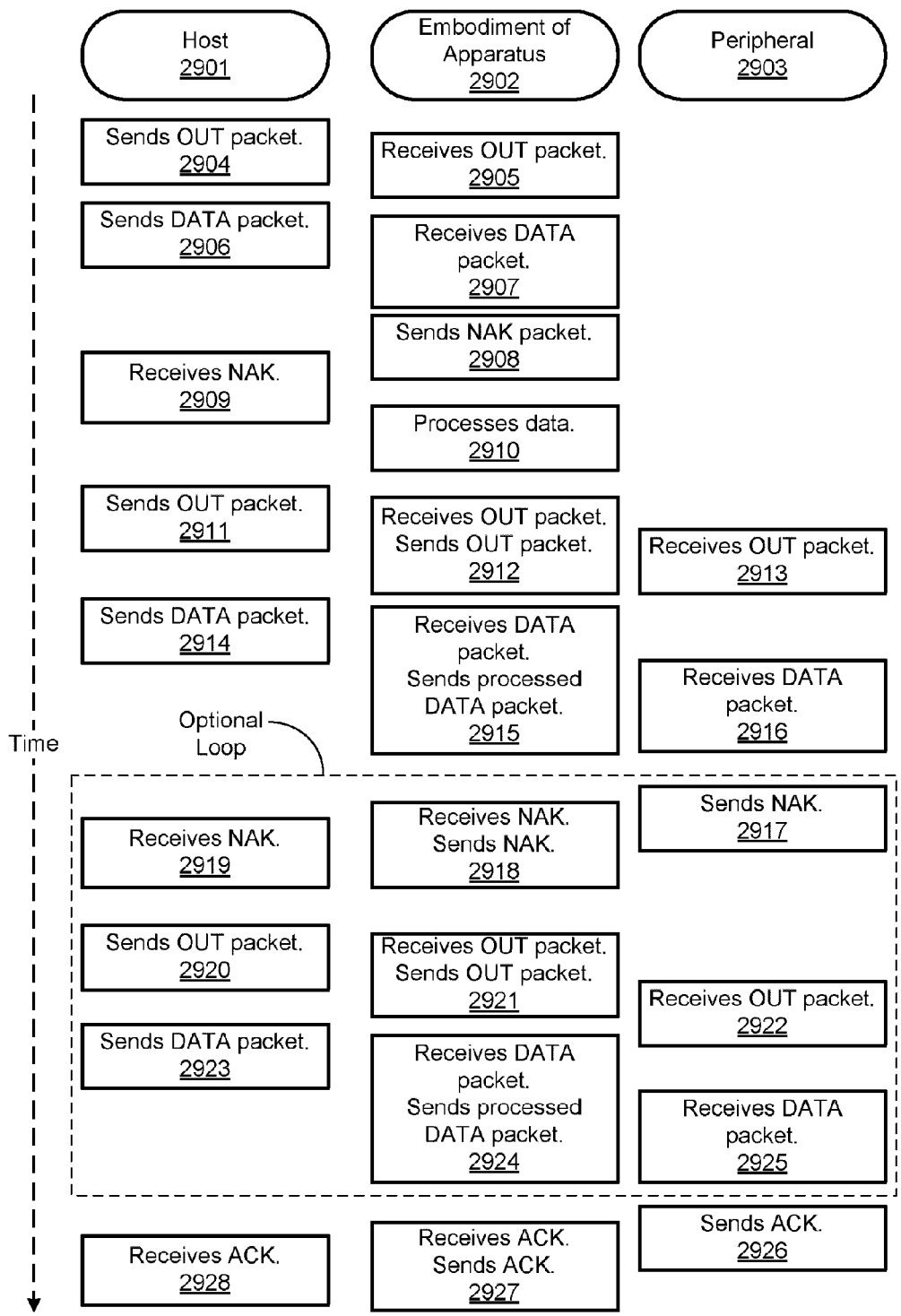
FIG. 29 is a sequence diagram of logical processes performed in accordance with an alternate embodiment of the present invention.

FIG. 28 is a sequence diagram of logical processes performed in accordance with an embodiment of the present invention. Time increases moving downward as the arrow indicates. Processes performed in each of three devices are shown. One embodiment of an apparatus of the present invention is shown in FIG. 28 as 2802. The embodiment, 2802, is coupled to the host, 2801, and the peripheral, 2803, is coupled to the embodiment, 2802. The host, 2801, sends an OUT packet addressed to the peripheral, 2803, in process 2804. The embodiment receives this OUT packet in process 2805. The host then transmits a DATA packet in process 2806, which is received by the embodiment in process 2807. The embodiment then transmits an acknowledge packet to the host in process 2808, which is received by the host in process 2809. Although the acknowledge packet is transmitted by the embodiment rather than the peripheral, the host interprets the acknowledge packet as being sent by the peripheral because the embodiment emulates the peripheral when sending the acknowledge packet. Note that the acknowledge packet is chosen for illustration, and other responses may be appropriate for different embodiments, such as not yet, stall, error, a smashed packet, a corrupt packet, or no response such as in the case of isochronous transfers. FIG. 29 illustrates an example using a negative-acknowledge. Returning to FIG. 28, one benefit of transmitting an acknowledge packet is that the transaction with the host is concluded. This allows the embodiment time to process the data it received from the host. In process 2810, the embodiment processes the data, which may include analyzing, modifying, encrypting, garbling, or other processing of the data. The processed DATA packet may, for example, be the same as the DATA packet received from the host but with certain portions encrypted. Next, the embodiment emulates the host and initiates transmission of an OUT packet in process 2811, which is received by the peripheral in process 2812. The embodiment continues to emulate the host and sends the processed DATA packet in process 2813, which is received by the peripheral in process 2814. At this point, the peripheral may optionally respond with a negative-acknowledge signal as illustrated in process 2815. This negative-acknowledge is received by the embodiment in process 2816. Sometime later, the embodiment will re-transmit the OUT packet in process 2817, which is received in process 2818. The embodiment will then transmit the processed DATA packet as indicated in process 2819, which is received by the peripheral as indicated in process 2820. The peripheral may again opt to transmit a negative-acknowledge packet, at which point the loop would repeat. Otherwise, the peripheral will transmit an acknowledge packet as indicated in process 2821, which is received by the embodiment in process 2822. This concludes the transaction.

FIG. 28 describes a situation in which the embodiment may emulate the host or the peripheral at certain times. At least one benefit of the emulation is that it allows the embodiment to intercept the packets being transmitted in order to process them. This method of using emulation in order to intercept the packets helps to preserve the communication. For example, if instead the embodiment receives the OUT packet, sends it on to the peripheral, receives the DATA packet, attempts to process the data, and then sends the processed data to the peripheral without performing any emulation, the communication interface or bus may enter a timeout condition or other erroneous condition. Such a condition risks termination or interruption of communication.

The embodiment as illustrated in FIG. 28 may provide additional functionality which may include but is not limited to the following. When the apparatus is not sending communications to the host, the apparatus may maintain the communication in such a way that resembles a peripheral, such as by electrically terminating the D+/D− line to a 45 ohm resistor. Furthermore, when the apparatus is not sending communications to the peripheral, the apparatus may maintain the communication in such a way that resembles a host, such as by electrically terminating the D+/D− line to a 45 ohm resistor and sending start of frame or keep alive packets and IN packets.

One notable added benefit is described below. In the prior art described in FIGS. 26 and 27, if the peripheral sends a negative-acknowledge, the host must continue to send the OUT and DATA packets in a loop. This loop is repeated if the peripheral continues to send a negative-acknowledge, which can occur thousands of times. This process occupies bandwidth on the bus. As shown in FIG. 28, in an embodiment of the apparatus, this process can be isolated to occur only between the apparatus and the peripheral. This reduces bandwidth requirements on the bus between the host and other peripherals. In this way, an embodiment of the invention may protect one or more of the host and bus by isolating them from this communication.

In certain embodiments, there may be a situation in which the apparatus has acknowledged the receipt of data from the host by emulating the peripheral, however a condition precludes the apparatus from sending this data to the peripheral. Such a condition may include the peripheral device malfunctioning or being disconnected. The apparatus may include a section that identifies itself as a separate peripheral device to the host. In an embodiment, such a section may interface with user, for example to notify the user of a condition as described above. In another embodiment, the apparatus may use other means to inform the user of such a condition, for example by illuminating an LED.

FIG. 29 is a sequence diagram of logical processes performed in accordance with an alternate embodiment of the present invention. Time increases moving downward as the arrow indicates. Processes performed in each of three devices are shown. One embodiment of an apparatus of the present invention is shown in FIG. 29 as 2902. The embodiment, 2902, is coupled to the host, 2901, and the peripheral, 2903, is coupled to the embodiment, 2902. The host, 2901 transmits an OUT packet addressed to the peripheral, 2903, in process 2904. The embodiment, 2902, receives this packet in process 2905. The host then transmits a DATA packet as indicated in process 2906, and the embodiment receives this packet in process 2907. The embodiment sends a negative-acknowledge packet in process 2908 emulating the peripheral, which is received by the host in process 2909. Since the negative-acknowledge packet indicates to the host to retransmit the data at a later time, the subsequent OUT and DATA packet sent from the host will be identical to the OUT and DATA packet send in processes 2904 and 2906 respectively. Therefore the DATA packets sent in processes 2914 and 2923 do not need to be processed. At this point, the embodiment processes the data it has received from the host, as illustrated in process 2910. Note that although it has not been illustrated, the host may send an OUT packet before process 2910 has completed. If this is the case, the embodiment will receive the OUT packet, the host will transmit a DATA packet, the embodiment will receive the DATA packet, the embodiment will transmit a negative-acknowledge packet emulating the peripheral, and the host will receive the negative-acknowledge packet, similar to processes 2904-2909. Once process 2910 completes, the host will transmit an OUT packet sometime later in process 2911. The embodiment will receive and transmit this packet in process 2912 emulating the host. The peripheral will then receive this packet in process 2913. The host will then transmit the DATA packet in process 2914. The embodiment will receive this DATA packet and transmit the processed DATA packet in process 2915 emulating the host. This is the processed DATA packet created from process 2910. This packet is then received by the peripheral in process 2916.

At this point, the peripheral may optionally respond with a negative-acknowledge, as illustrated in packet 2917. If this occurs, the embodiment will receive and transmit the negative-acknowledge packet emulating the peripheral as indicated in process 2918. The host will then receive the negative-acknowledge in process 2919. Sometime later, the host will transmit the OUT packet as illustrated in process 2920. The embodiment will receive this OUT packet and transmit it in process 2921 emulating the host. The peripheral will receive the OUT packet in process 2922. The host will then send a DATA packet as illustrated in process 2923. The embodiment will receive this packet and transmit the processed DATA packet in process 2924 emulating the host. This is still the processed DATA packet created from process 2910. The peripheral receives this DATA packet in process 2925. The peripheral may again opt to respond with a negative-acknowledge, in which case the loop will repeat. However, at some point the peripheral will respond with an acknowledge packet as illustrated in process 2926. The embodiment will receive and transmit the acknowledge packet as illustrated in process 2927 emulating the peripheral. The host will receive this acknowledge packet in process 2928, which concludes the transaction.

Similar to FIG. 28, FIG. 29 also describes an embodiment where emulation is used to intercept and process data while preserving the communication. In process 2908, rather than having the embodiment respond to the host with an acknowledge packet as in FIG. 28 process 2808, the embodiment responds with a negative-acknowledge. A negative-acknowledge does not conclude the transaction, but it still provides additional time for the embodiment to process the data. At least one benefit of the processes described in FIG. 29 is that the negative-acknowledge packet sent in process 2908 is the only packet that the embodiment must generate during emulation other than the processed DATA packet. In other processes where the embodiment performs emulation, including 2912, 2915, 2918, 2921, and 2927, the embodiment can forward the transmission it received from one of the host and peripheral to the other of the host and peripheral. At least one benefit of this is that considerations of bus time allocation can be managed by the host rather than the embodiment.

Figure 30:
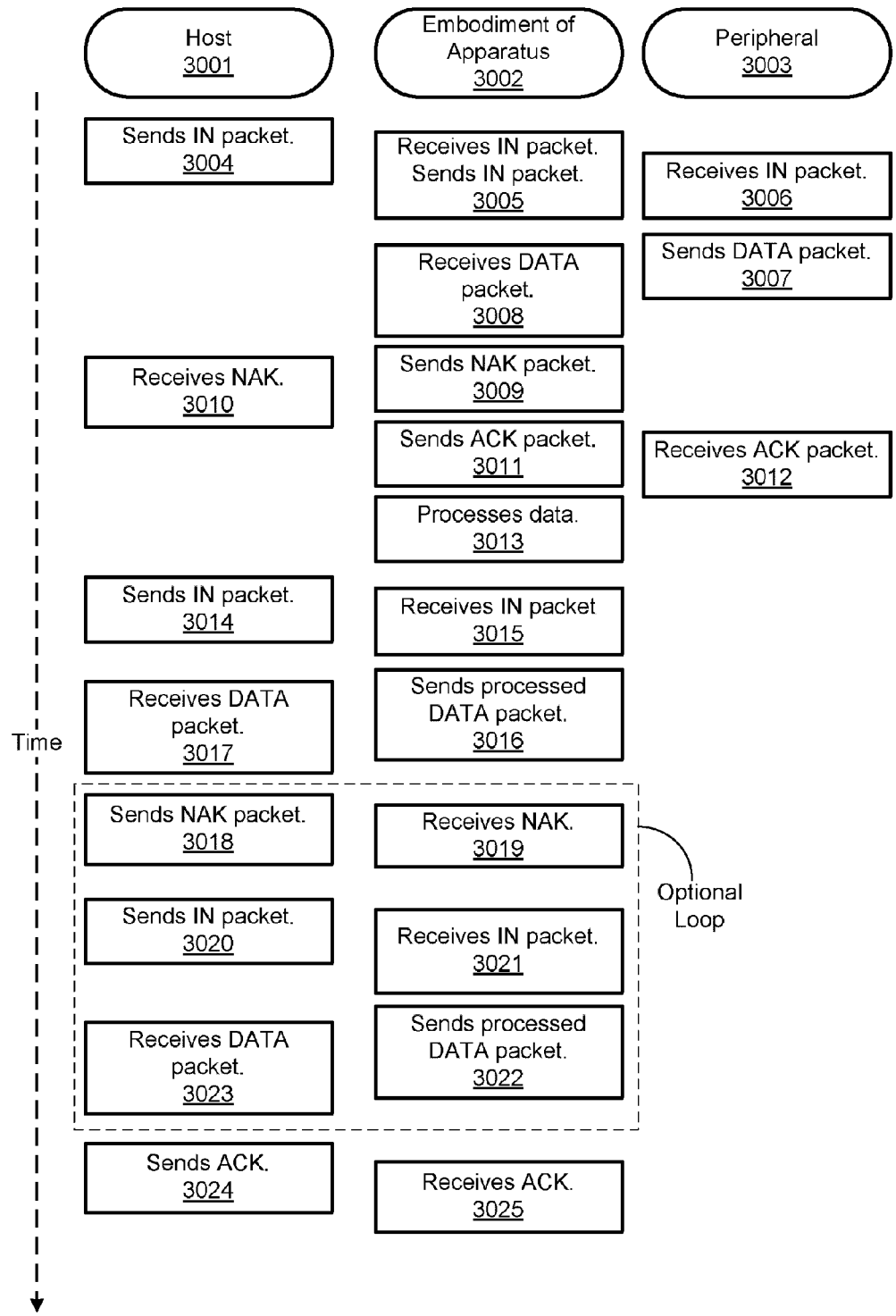
FIG. 30 is a sequence diagram of logical processes performed in accordance with an alternate embodiment of the present invention.

FIG. 30 is a sequence diagram of logical processes performed in accordance with an alternate embodiment of the present invention. Time increases moving downward as the arrow indicates. Processes performed in each of three devices are shown. One embodiment of an apparatus of the present invention is shown in FIG. 30 as 3002. The embodiment, 3002, is coupled to the host, 3001, and the peripheral, 3003, is coupled to the embodiment, 3002. The host, 3001, transmits an IN packet in process 3004 that is addressed to the peripheral, 3003. The embodiment, 3002, receives the IN packet in process 3005 and transmits it emulating the host. The peripheral then receives the IN packet in process 3006. Note that although it is not illustrated, the peripheral may respond with a negative-acknowledge at this point. In this case, the embodiment will receive and transmit this negative-acknowledge, the host will receive the negative-acknowledge, at some point later, the host will transmit the IN packet again, the embodiment will receive and transmit the IN packet and the peripheral will receive the IN packet. However, at some point, the peripheral will respond with a DATA packet as illustrated in process 3007. This DATA packet is then received by the apparatus in process 3008. The embodiment then transmits a negative-acknowledge packet emulating the peripheral in process 3009, which is received by the host in process 3010. At least one benefit of process 3009 is that the embodiment can take additional time to process the data without causing a condition that may interrupt or terminate the communication. The embodiment then transmits an acknowledge packet to the peripheral emulating the host as illustrated in process 3011, which is received by the peripheral in process 3012. Note that the acknowledge and negative-acknowledge packets are chosen for illustration. Other packets may be appropriate for alternate embodiments of the invention. The embodiment then processes the data as illustrated in process 3013. Note that the host may send an IN packet before process 3013 completes. If this occurs, the embodiment will receive the IN packet and then send a negative-acknowledge packet, and then the host will receive the negative-acknowledge packet. At some point, process 3013 will complete, and sometime later the host will send an IN packet as illustrated in process 3014. The embodiment will then receive this packet in process 3015. The embodiment will send the processed DATA packet in process 3016 emulating the peripheral, which is then received by the host in process 3017. The host may then optionally respond with a negative-acknowledge packet as illustrated in process 3020. In this case, the embodiment will receive the negative-acknowledge packet in process 3019. The host will sometime later issue another IN packet in process 3020 which is received by the embodiment in process 3021. The embodiment will transmit the processed DATA packet in process 3022 emulating the peripheral, which is received by the host in process 3023. The host may again respond with a negative-acknowledge packet, in which case the loop repeats. However, at some point, the host will respond with an acknowledge packet as illustrated in process 3024. This packet is received by the embodiment in process 3025, which concludes the transaction.

As noted, in many prior art bus architectures, data is broadcast from a host to more than one peripheral coupled to the bus. In such cases, the peripherals should respond only to data that is addressed to them. However, a rogue peripheral may respond, such as by copying data that is not addressed to the peripheral. Such a rogue peripheral may pose a security risk. Such a circumstance will now be described, with reference to FIG. 20.

Figure 20:
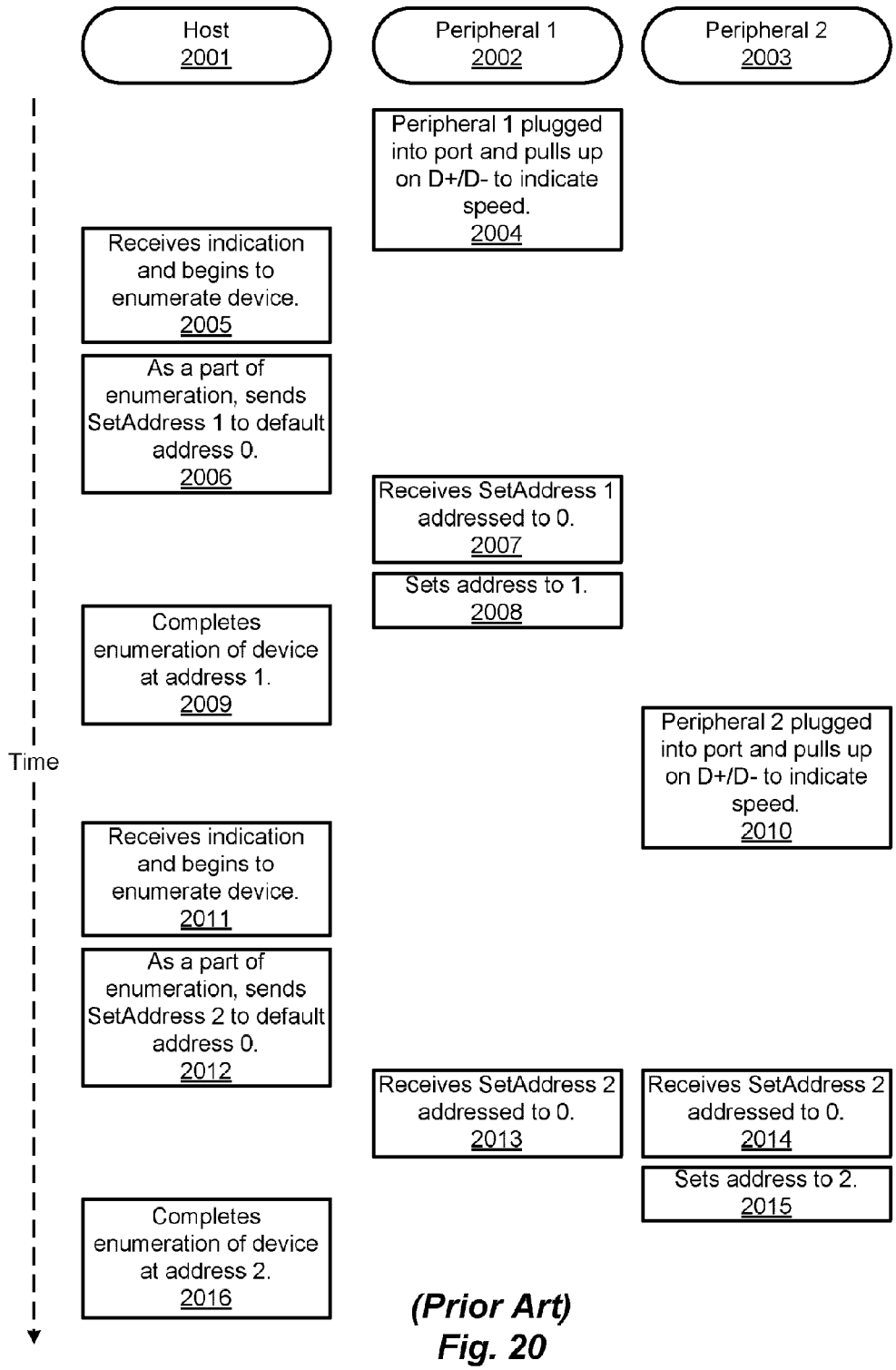
FIG. 20 is a sequence diagram of logical processes performed in a host and one or more peripheral devices, according to the prior art.

FIG. 20 is a sequence diagram of logical processes performed in a host and one or more peripheral devices, according to the prior art. Time increases moving downward as the arrow indicates. The first process, 2004, occurs in Peripheral 1, 2002. In this process, Peripheral 1 is plugged into the port and pulls up on one of the D+ and D− lines (assuming the ports are coupled via a USB) to indicate the speed of the peripheral device. The host, 2001, receives this indication and begins to enumerate the peripheral device, as shown in process 2005. Prior to the set address part of enumeration, peripheral devices are set to the default address 0. Next, under process 2006, the host sends a command to have the peripheral device set its address to 1. In process 2007, Peripheral 1 receives this command and sets its address to 1, as shown in process 2008. In process 2009, the host completes the enumeration of the peripheral device at address 1. Next, in process 2010, Peripheral 2, 2003, is plugged into the port and pulls up on one of the D+ and D− lines to indicate the speed of the peripheral device. The host receives this indication and begins to enumerate the peripheral device, as shown in process 2011. Next, under process 2012, the host sends a command to have the peripheral device set its address to 2. In the bus architecture illustrated in FIG. 20, data is broadcast from the host to all peripherals. Therefore both Peripheral 1 and Peripheral 2 receive the set address command, even though it is only addressed to Peripheral 2. These two processes are 2013 and 2014. According to the bus specification, Peripheral 1 is to discard the data that is not addressed to it. However, the prior art provides no way to determine if Peripheral 1 disregards the data. Therefore, no process is shown to indicate whether the data is disregarded or not. The fact that the data may not be disregarded is a security risk that is posed by the broadcasting architecture illustrated here. The next process, 2015, is performed in Peripheral 2. The peripheral device sets its address to 2. Finally, in process 2016, the host completes enumeration of the peripheral device at address 2.

Figure 21:
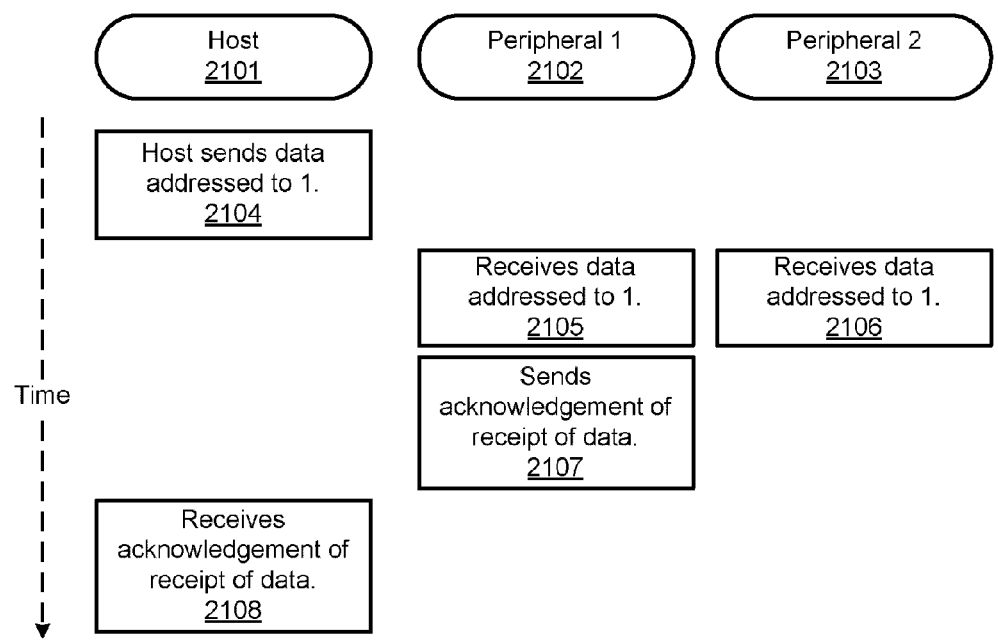
FIG. 21 is a sequence diagram of logical processes performed in the host and peripheral devices of FIG. 20.

FIG. 21 is a sequence diagram of logical processes performed in the host and peripheral devices, according to the prior art. Time increases moving downward as the arrow indicates. The host, 2101, sends data addressed to 1 in process 2104. In the bus architecture illustrated in FIG. 21, data is broadcast from the host to all peripherals. Therefore both Peripheral 1, 2102, and Peripheral 2, 2103, receive the data, even though it is only addressed to Peripheral 1. The receipts of data by the peripheral devices are shown in processes 2105 and 2106. According to the bus specification, Peripheral 2 is to discard the data that is not addressed to it. However, the prior art provides no way to determine if Peripheral 2 disregards the data. Therefore, no process is shown to indicate whether the data is disregarded or not. The fact that the data may not be disregarded is a security risk that is posed by the broadcasting architecture illustrated here. The next process, 2017, is performed in Peripheral 1. The peripheral device sends the host an acknowledgement of the receipt of data. In process 2108, the host receives the acknowledgement of the receipt of data.

Figure 25:
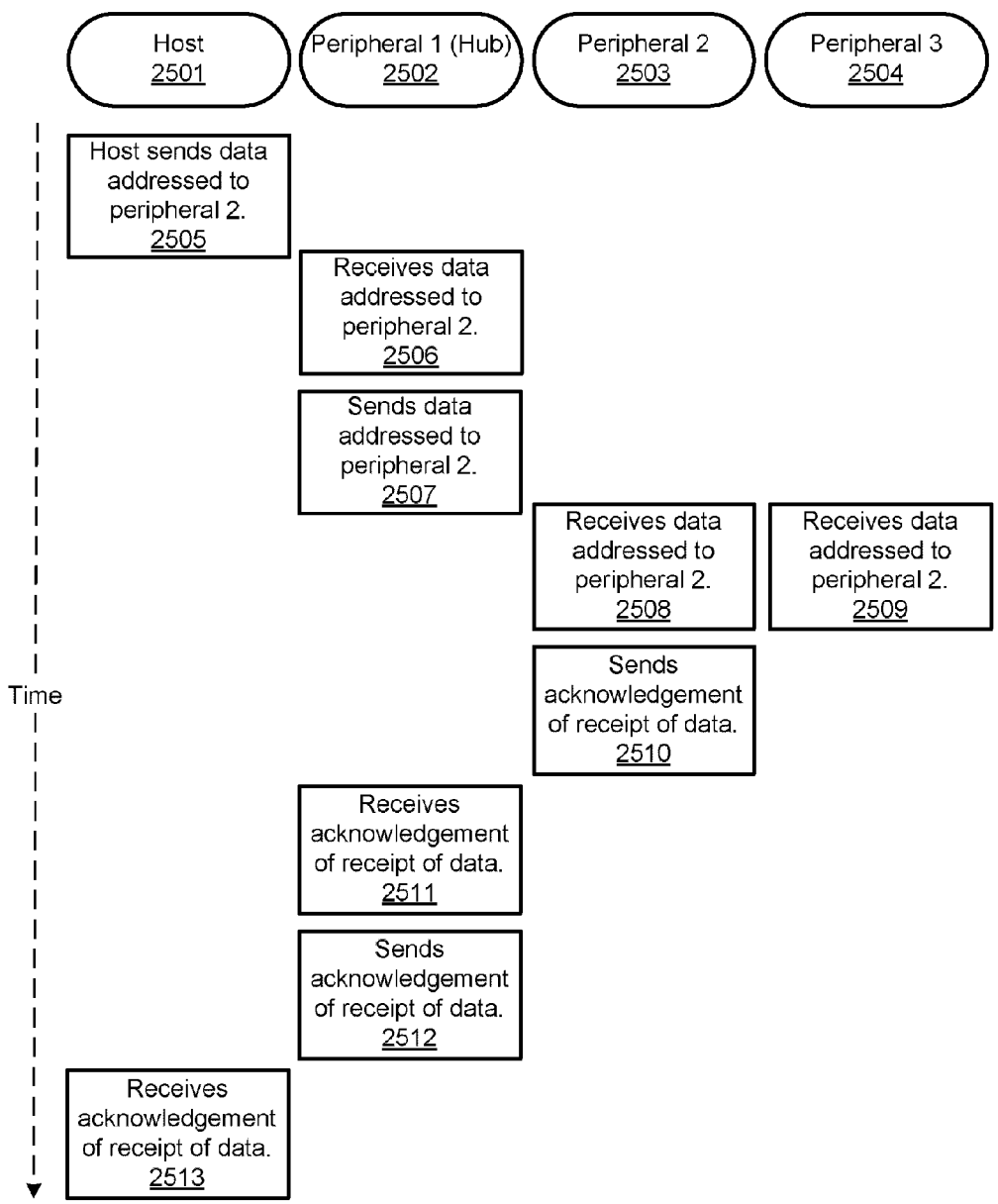
FIG. 25 is a sequence diagram of logical processes performed in a host and one or more peripheral devices, according to the prior art.

FIG. 25 is similar to FIG. 21 in that it demonstrates a security risk that is posed by the broadcasting architecture, according to the prior art. FIG. 25 includes a hub 2502 in the communication to demonstrate security risk persists with the inclusion of a hub. FIG. 25 is a sequence diagram of logical processes performed in a host 2501 and one or more peripheral devices, exemplified by peripheral devices 2502, 2503 and 2504, according to the prior art. Time increases moving downward as the arrow indicates.

In this sequence, the peripheral 1 2502 may be a hub and is coupled to the host 2501. Peripherals 2 and 3 2503 and 2504 are coupled to peripheral 1 2502. Process 2505 occurs in the host, 2501. In process 2505, the host 2501 sends data addressed to peripheral 2 2504. In process 2506, peripheral 1 2502 receives this information. In process 2507, peripheral 1 2502 retransmits this data addressed to peripherals 2 2503. This data is received by Peripheral 2 in process 2508. However, problematically, this data is also received by peripheral 3 2504 in process 2509. It should be noted that peripheral 3 2504 is not the intended recipient of the data, and peripheral 3 2504 should discard the data. However, a rouge peripheral 3 2504 may misuse the received data.

In process 2510, Peripheral 2 responds by sending an acknowledgement of the receipt of the data. In process 2511, Peripheral 1 receives this acknowledgement signal, and in process 2512, Peripheral 1 2502 retransmits this acknowledgment to the host 2501. Finally, in process 2513, the host 2501 receives the acknowledgement of the receipt of the data.

Figure 16:
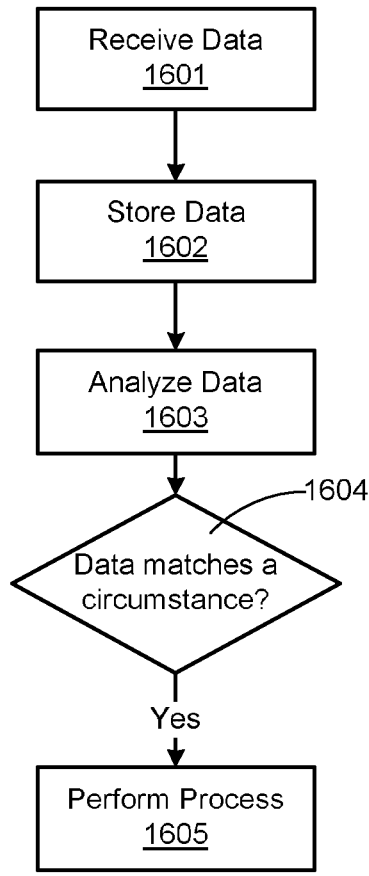
FIG. 16 is a block diagram of logical processes performed in accordance with an embodiment of the present invention.

Embodiments of the present invention solve the problem posed by the prior art by preventing data from being made available to unintended bus peripherals. One such embodiment will now be described, with reference to FIG. 16. FIG. 16 is a block diagram of logical processes performed in accordance with an embodiment of the present invention. In this embodiment, under process 1601, data is received from the network or other data source. In process 1602, the received data is stored. In addition, process 1603 analyzes the stored data. In decision process 1604, there is a determination of whether the data matches a circumstance. If process 1604 determines that the data matches a circumstance, then there is performed a process 1605, which is defined by a rule.

The processes shown in FIG. 16 may optionally be performed in an apparatus that is physically separate from nodes on the network. In another embodiment, however, the processes may be performed in hardware that is integrated into the host computing device. For example, software for performing the processes may be integrated into the host at the kernel or BIOS level. Alternatively, the processes may be integrated into at least one of the USB root hub and the south bridge. In yet additional embodiments, the processes may be performed in the peripheral device itself by direct integration into the peripheral or in a component that is physically coupled to the peripheral to make a compound device. In particular, among other things, the process may be performed in hardware or in software in any of the foregoing locations. In another embodiment, the processes may be performed in a component that is physically coupled to the peripheral to make it a compound device. In yet an additional embodiment, the processes may be performed in a component that is physically coupled to the peripheral to make it a composite device.

Figure 23:
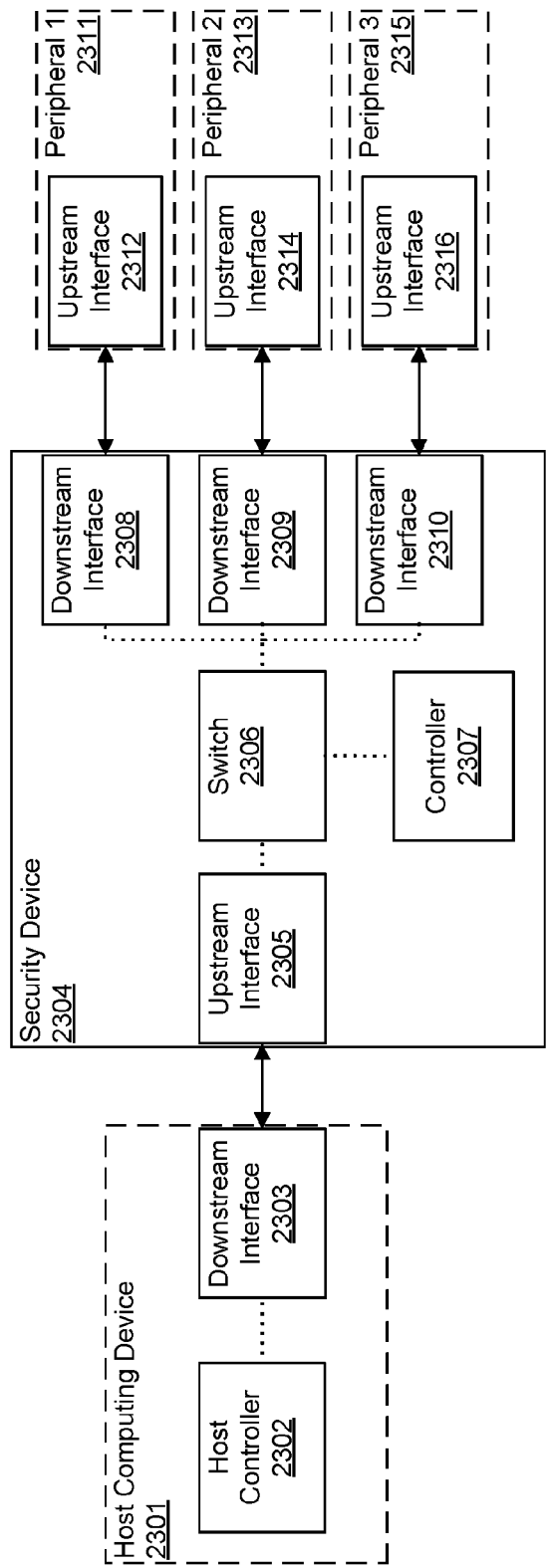
FIG. 23 is a schematic block diagram of a security device, in accordance with an embodiment of the present invention.

FIG. 23 is a schematic block diagram of a security device 2304, according to an embodiment of the present invention. A host computer 2301 includes a USB host controller 2302 and a USB downstream interface 2303. USB peripherals 2311, 2313 and 2315 are coupled to the host computer 2301 via the security device 2304. The security device 2304 includes an upstream USB interface 2305 and at least one downstream USB interface 2308, 2309, 2310. The terms "upstream" and "downstream" are not meant to imply any particular distance between the host 2301 and upstream interface 2305 or between the downstream interfaces 2308, 2309 and 2310 and the peripherals 2311, 2313 and 2315. The host 2301 may be connected to the upstream interface 2305 via a cable, via printed circuit wiring of a circuit board to which both the host 2301 and the upstream interface 2305 are connected or by any other connection. In particular, the upstream interface 2305 may be implemented in the same integrated circuit as the host 2301 or parts of the host 2301. Similarly, the downstream interfaces 2308, 2309 and 2310 may be connected to the peripherals 2311, 2313 and 2315 by any suitable interconnect, and two or more of these components may be implemented in a single integrated circuit.

Other numbers of downstream USB interfaces may be used. The upstream USB interface 2305 is connected to the downstream USB interfaces 2308-2310 via a switch 2306, which is controlled by a controller 2307. The controller 2307 may be, for example, a microprocessor executing instructions stored in a memory (not shown).

To communicate with a peripheral 2311, 2313, 2315, the host computer 2301 sends a command that addresses one of the peripherals 2311, 2313, 2315, as well as data the addressed peripheral is to receive. The controller 2307 analyzes the command, particularly the address, to ascertain which peripheral 2311, 2313, 2315 should receive the command and data. The controller 2307 controls the switch 2306, such that the received command and data are sent to only the one downstream USB interface 2308-2310 to which the addressed peripheral is coupled. If necessary the controller 2307 may buffer the command and data in the memory while the controller analyzes the command, and then send the buffered command and data to the addressed peripheral. Finally, the addressed peripheral receives the data at its upstream interface 2312, 2314, 2316.

When one of the peripherals 2311, 2313, 2315 sends data, the controller 2307 controls the switch 2306, such that the data is forwarded via the upstream USB interface to the host computer 2301. The controller 2307 controls the switch 2306 to prevent any peripheral 2311, 2313, 2315 from communicating directly with any other peripheral.

It should be noted that the disclosed security device is unlike a conventional computer network switch or router, at least because computers coupled to network switches and routers can communicate with each other via the switches and routers, whereas peripherals coupled to the disclosed security device cannot communicate with each other via the security device. For example, in the case of a computer network switch, one or more computers may be coupled to each port on the switch, and a computer coupled to one port may communicate with a computer coupled to any other port. Computer network switches, routers, etc. do not include upstream and downstream interfaces, as described with reference to FIG. 23, at least in that commands and data received via the disclosed upstream interface (for example, upstream USB interface 2305) are always forwarded to one of the downstream interface (2308-2310), and data received via one of the downstream interfaces is forwarded to only the upstream interface (2305). The upstream interface is not interchangeable with any of the downstream interfaces, because the upstream interface is coupled to the host computer, and the downstream interfaces are coupled to peripherals. In contrast, ports on a computer network switch are all interchangeable.

The disclosed security device is also unlike layer 3 switches, at least because the interface capabilities are automatic, whereas layer 3 switches must be programmed with routing tables. The characteristics of upstream and downstream interfaces are inherent and may also swap automatically. If they swap, they do so without needing to update a preconfigured routing table.

Figure 24:
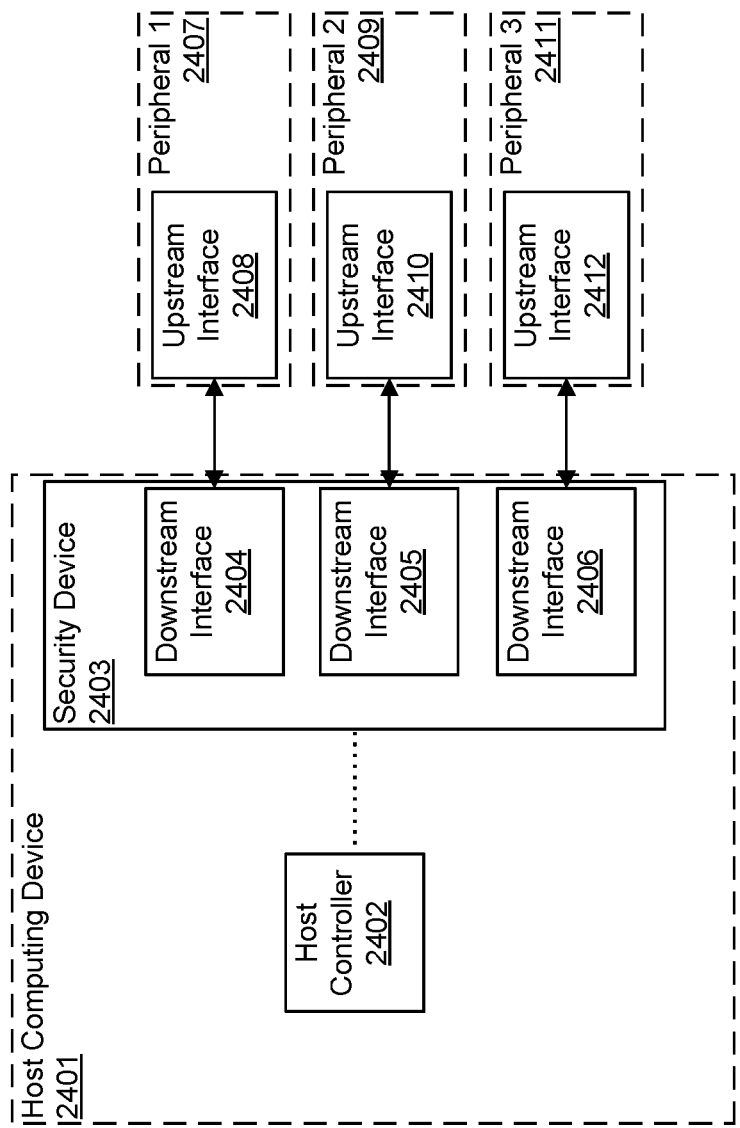
FIG. 24 is a schematic block diagram of a security device, in accordance with another embodiment of the present invention.

FIG. 24 is a schematic block diagram of a security device 2403, according to another embodiment of the present invention. The security device 2403 of FIG. 24 is similar to the security device 2304 of FIG. 23, except the security device 2403 is included within the host computer 2401. A USB host controller 2402, also within the host computer 2401, is coupled to the security device 2403. Downstream interfaces 2404-2406 of the security device 2403 are coupled to USB peripherals 2407, 2409, 2411 through their upstream interfaces 2408, 2410, 2412. Note that the security device 2403 can be integrated with the host controller 2402.

Figure 17:
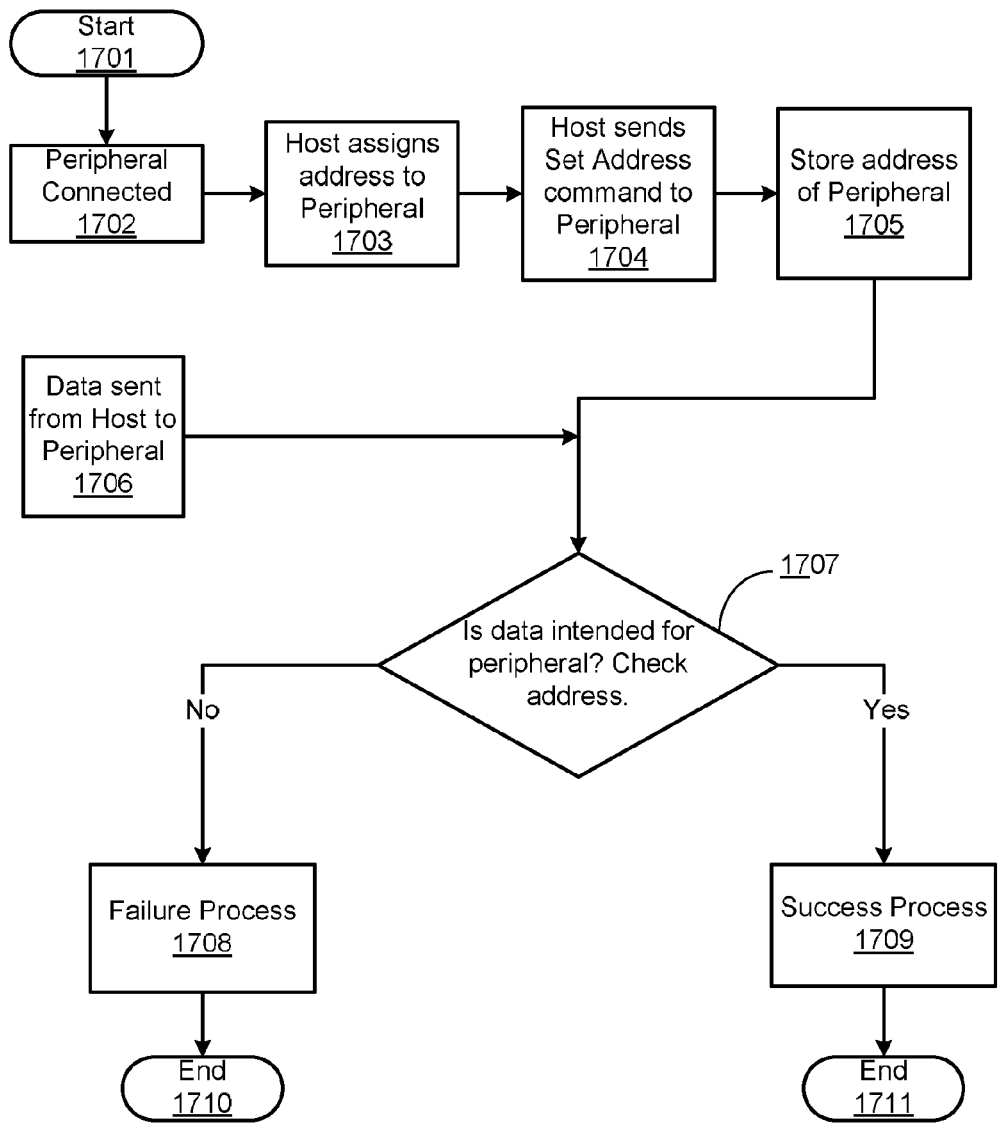
FIG. 17 is a block diagram showing logical flow in accordance with an embodiment of the present invention.

FIG. 17 is a block diagram showing logical flow in accordance with an embodiment of the present invention. The illustrated process starts at item 1701. At item 1702, the peripheral is connected and data characterizing a nature of the peripheral is received from the peripheral device. At item 1703, the host computing device assigns an address to the peripheral device. At item 1704, the host computing device sends the set address command to the peripheral device instructing it to use the address that the host computing device assigned for the peripheral device. This address is stored by the store data process 1705. After this point, in item 1706 when data is sent from the host computing device to the peripheral device, decision process 1707 checks the address of the data to determine if the data is intended for the peripheral device. If the data is not intended for the peripheral device because the address of the data does not match the circumstance defined by the stored address, the failure process 1708 is performed. According to some embodiments the failure process may preclude communication to one or more nodes in the network. Alternatively, or in addition, the failure process may include terminating the communication. If the result of the decision process 1707 is positive, a success process 1709 is performed. In an embodiment, steps 1706 onwards can be repeated any number of times after steps 1701 through 1705 have taken place.

Figure 18:
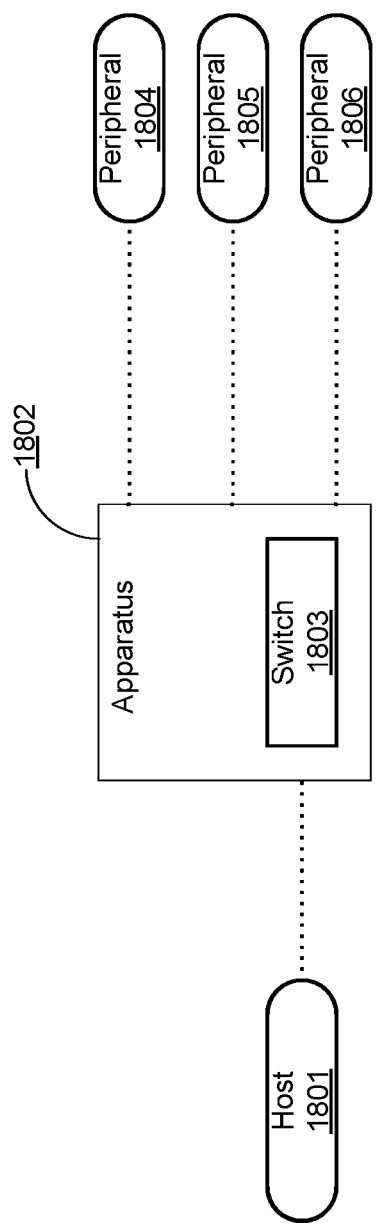
FIG. 18 is a block diagram of the architecture of a hardware embodiment of the present invention.

FIG. 18 is a block diagram of the architecture of a hardware embodiment of the present invention. The hardware can be viewed as a hardware apparatus 1802 that is placed between the host computing device 1801 and the peripheral devices 1804, 1805, and 1806. The embodiment shown in FIG. 18 includes a switch module 1803. The apparatus 1802, implements the processes described above in connection with FIGS. 16-17, and as further described below. In an alternative embodiment, the apparatus and one or more peripherals may be integrated into a single module.

Figure 19:
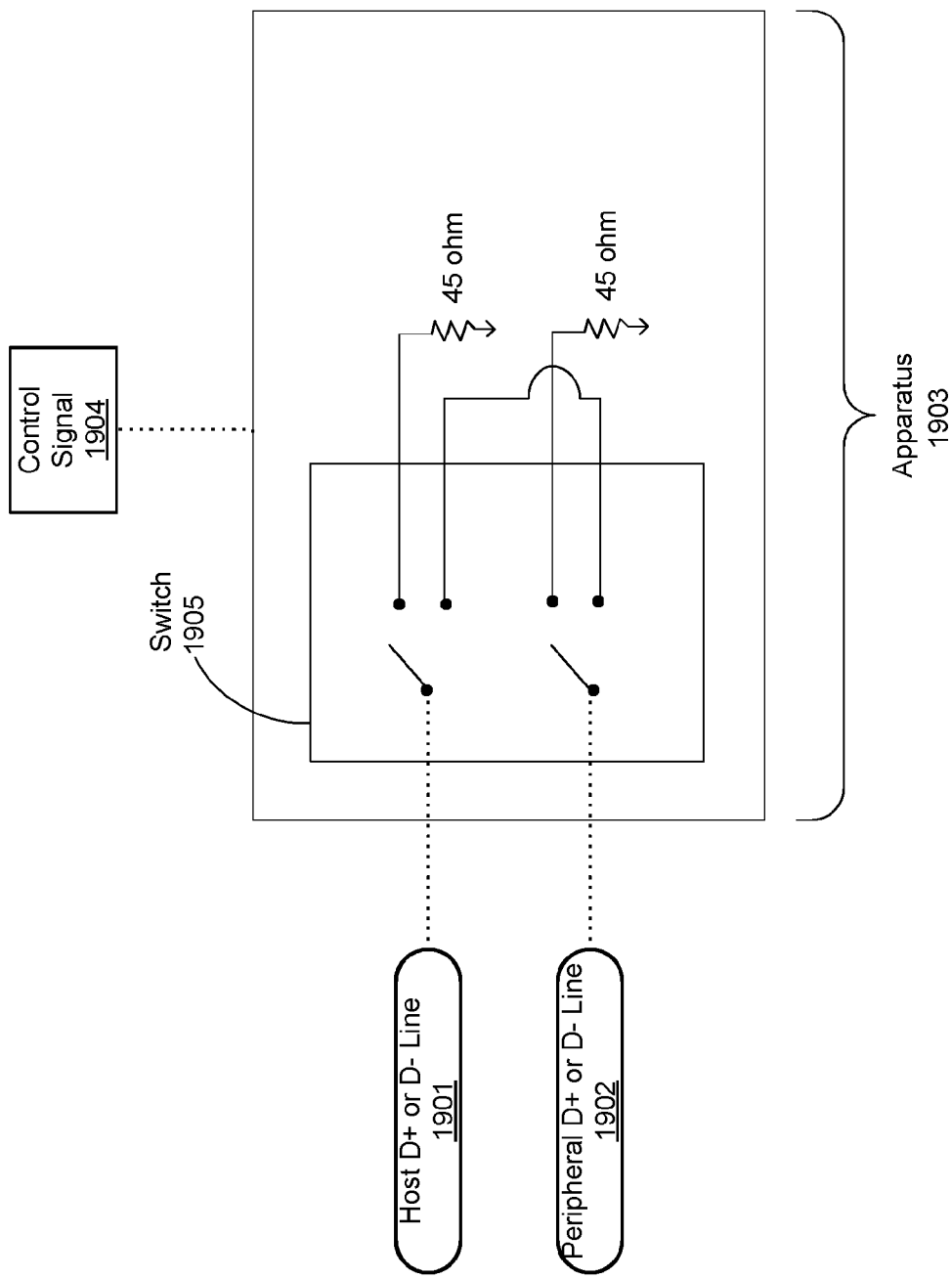
FIG. 19 is a block diagram of a hardware embodiment of the present invention providing further details for implementation of the embodiment of FIG. 18.

FIG. 19 is a block diagram of a hardware embodiment of the present invention providing further details for implementation of the embodiment of FIG. 18. The hardware can be viewed as a hardware apparatus 1903 that is placed between each of the D+ and the D− lines of the host computing device 1901 and the peripheral devices, represented here by a single peripheral device 1902. The embodiment shown in FIG. 19 includes a switch module 1905 which switches the transmission line from a linked state, where host and peripheral are connected, to an electrical termination state, where lines are tied to resistors in this embodiment. The apparatus 1905 may optionally include a control signal 1904. In the linked state, communications from the host are passed directly through to the peripheral, and vice versa. The electrical termination state causes the communications to be stopped at the apparatus, and not directly passed through. The electrical termination state could, for example, emulate the idle state of a host or a peripheral. The 45 ohm resistor shown in FIG. 19 is an example of an embodiment.

One example of one benefit of the embodiment is as follows. The host may be sending communications to the peripheral with the switch in the linked state. A control signal may be issued to indicate that data posing a security risk is coming. The transmission line is switched to the electrical termination state. The host does not detect the electrical termination in the apparatus as different from the peripheral it was communicating with. The host continues to send the data posing a security risk. The data is not transmitted to the peripheral because the switch is not in the linked state, thereby addressing the security risk. Subsequently, the control signal indicates that the next set of data coming does not pose a security risk. The transmission line is switched to the linked state. The host continues to communicate with the peripheral.

One benefit of electrically terminating the transmission line is to preserve the communication in such a way that the peripheral and host do not have to restart the communication again once reconnected, avoiding having to perform actions such as the enumeration process or handshake.

Figure 22:
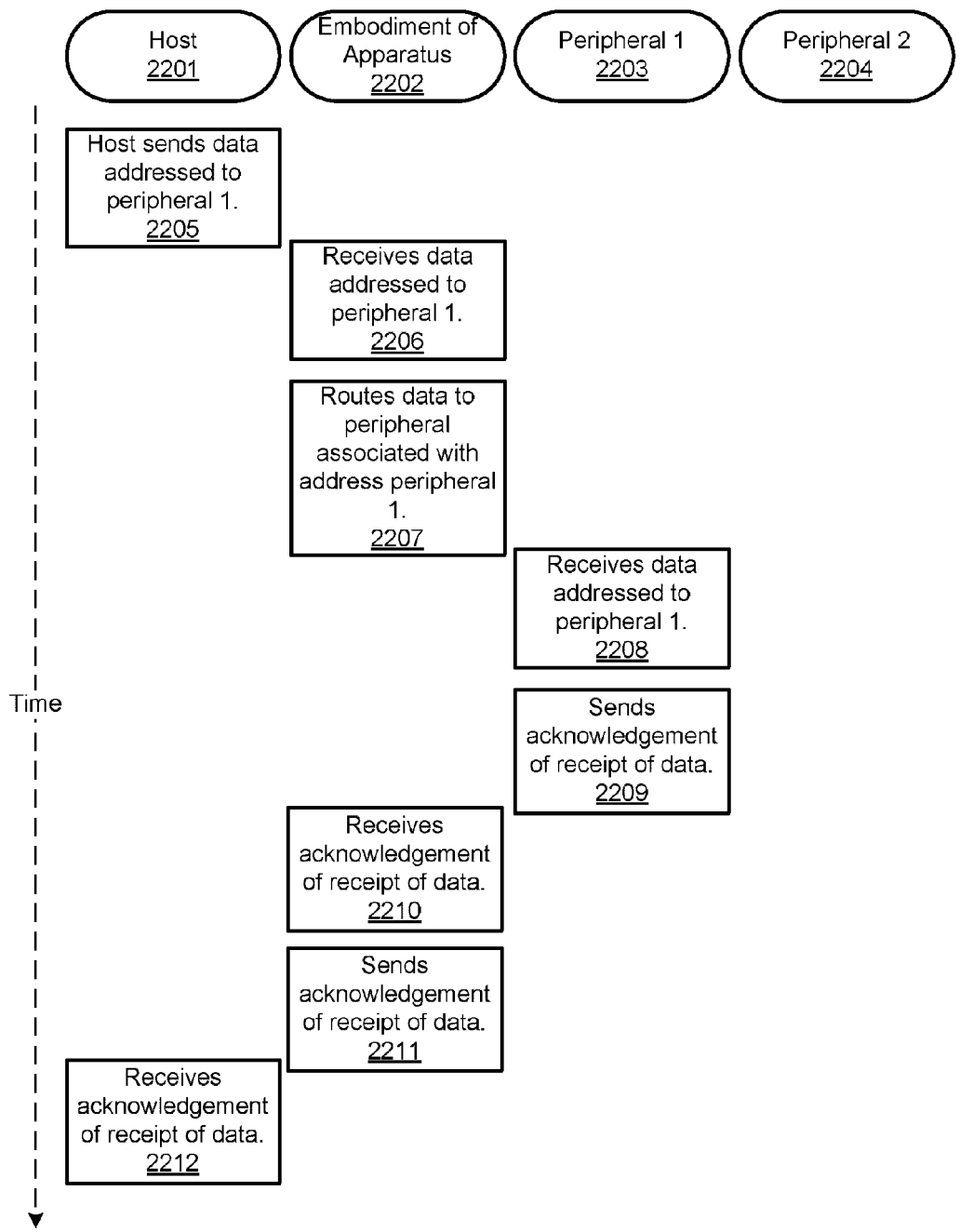
FIG. 22 is a sequence diagram of logical processes performed in accordance with an embodiment of the present invention.

FIG. 22 is a sequence diagram of logical processes performed in accordance with an embodiment of the present invention. One embodiment of an apparatus of the present invention is shown in FIG. 22 as apparatus 2202. Processes performed in each of four devices 2201, 2202, 2203 and 2204 are shown. Time increases moving downward as the arrow indicates.

In process 2205, the host 2201 sends data addressed to peripheral 1 2203. In process 2206, the data addressed to peripheral 1 2203 is received. In process 2207, the apparatus routes the data addressed to peripheral 1 2203 to the associated peripheral. Next, in process 2208, peripheral 1 2203 receives the data. Peripheral 2 2204 does not receive the data. In process 2209, peripheral 1 2203 sends an acknowledgement of the receipt of data. In process 2210, the apparatus 2202 receives the acknowledgement, and in process 2211, the apparatus 2202 sends an acknowledgement to the host 2201. In process 2212, the host 2201 receives this acknowledgement.

Although some examples have been described in the context of USB hosts and USB peripherals, other types of interconnects may be used. Some embodiments of the present invention may be implemented in a root hub. In addition, embodiments of the present invention may be integrated with hosts, portions of hosts, peripherals, and/or portions of peripherals. For example, as noted, embodiments of the present invention, such as embodiments that include switches to prevent forwarding data to non-addressed peripherals, or embodiments that silence a logical or physical connection between a host and a peripheral if inappropriate data or other circumstances are detected, may be implemented within what might conventionally be considered a "host" or within what might be conventionally be considered a "peripheral." In one example, an embodiment of the present invention may be included in a processor, motherboard or other component of a computer, such as a desk-side computer, a laptop computer, a tablet computer, a smartphone, or other device that conventionally may be thought of as a host.

In another example, an embodiment of the present invention is included in a "peripheral," such as a rotating or solid state disk drive, between the disk drive's external interface and data storage components within the disk drive. A processor in the disk drive that controls the disk drive, such as by interpreting commands and disk addresses sent to the disk drive, may also implement all or part of the functionality of the included embodiment. Alternatively, a separate processor or other circuitry may implement the functionality of the included embodiment. Similarly, an embodiment of the present invention may be included in what is conventionally referred to as a USB "thumb" drive.

Various embodiments of the present invention may be characterized by potential claims listed in paragraphs following this paragraph (and before the actual claims provided at the end of this application). These potential claims form a part of the written description of this application. Accordingly, subject matter of the potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

(P27) A security device-implemented method of enhancing security of at least one of a host computing device ("host") and at least one peripheral device ("peripheral"), the security device comprising an upstream interface configured to be coupled via an upstream link to the host and to receive data from the host via the upstream link and to send data to the host via the upstream link, the security device further comprising at least one downstream interface, each downstream interface configured to be coupled via a respective downstream link to one of the at least one peripheral and to receive data from the one peripheral via the respective downstream link and to send data to the one peripheral via the respective downstream link, the method comprising:

receiving data via the upstream interface;

analyzing the received data to ascertain if the received data poses a security risk;

if the received data is ascertained not to pose a security risk, forwarding the received data to at least one of the at least one downstream interface; and if the received data is ascertained to pose a security risk, preventing forwarding the received data to any of the at least one downstream interface.

(P28) A method according to claim P27, wherein preventing forwarding the received data comprises:

changing the upstream link from a linked state to an electrically terminated state; and changing at least one of the respective downstream link from a linked state to an electrically terminated state.

(P29) A method according to claim P28, wherein changing the upstream link from a linked state to an electrically terminated state comprises coupling a termination resistor to the upstream link.

(P30) A computer program product for providing enhancing security of at least one of a host computing device ("host") and at least one peripheral device ("peripheral"), the security device comprising an upstream interface configured to be coupled via an upstream link to the host and to receive commands and data from the host via the upstream link and to send data to the host via the upstream link, each of at least some of the commands including an address of one of the at least one peripheral, the security device further comprising at least one downstream interface, each downstream interface configured to be coupled via a respective downstream link to one of the at least one peripheral and to receive data from the one peripheral via the respective downstream link and to send commands and data to the one peripheral via the respective downstream link, each peripheral being assigned an address, the computer program product comprising a non-transitory computer-readable medium having computer readable program code stored thereon, the computer readable program configured to:

receive commands and data via the upstream interface;

select at least one of the at least one downstream interface, based on an address in the received commands and data;

forward the received commands and data to the selected at least one of the at least one downstream interface.

(P31) A computer program product for enhancing security of at least one of a host computing device ("host") and at least one peripheral device ("peripheral"), the security device comprising an upstream interface configured to be coupled via an upstream link to the host and to receive data from the host via the upstream link and to send data to the host via the upstream link, the security device further comprising at least one downstream interface, each downstream interface configured to be coupled via a respective downstream link to one of the at least one peripheral and to receive data from the one peripheral via the respective downstream link and to send data to the one peripheral via the respective downstream link, the computer readable program configured to:

receive data via the upstream interface;

analyze the received data to ascertain if the received data poses a security risk;

if the received data is ascertained not to pose a security risk, forward the received data to at least one of the at least one downstream interface; and if the received data is ascertained to pose a security risk, prevent forwarding the received data to any of the at least one downstream interface.

The processes and methods described herein may be performed by a processor executing instructions stored in a memory. The memory may be random access memory (RAM), read-only memory (ROM), flash memory or any other memory, or combination thereof, suitable for storing control software or other instructions and data. Some of the functions performed by the described processes, methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable tangible storage media (e.g. read-only memory devices within a computer, such as ROM, or devices readable by a computer I/O attachment, such as CD-ROM or DVD disks), information alterably stored on writable tangible storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of processes, methods and systems have been described with reference to flowcharts, those skilled in the art should readily appreciate that functions, operations, decisions, etc. of all or a portion of each block, or a combination of blocks, of the flowchart may be combined, separated into separate operations or performed in other orders. Furthermore, disclosed aspects, or portions of these aspects, may be combined in ways not listed above. Accordingly, the invention should not be viewed as being limited to the disclosed embodiments.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A security device for coupling between a first device, configured to act at a given time as a host computing device ("host") and at least one second device, configured to act at the same time as a peripheral device ("peripheral"), each peripheral being assigned an address, the security device comprising:
   an upstream interface configured to be coupled via an upstream link to the host and to receive commands and data from the host via the upstream link and to send data to the host via the upstream link, each of at least some of the commands including an address of one of the at least one peripheral;
   at least one downstream interface, each downstream interface configured to be coupled via a respective downstream link to one of the at least one peripheral and to receive data from the one peripheral via the respective downstream link and to send commands and data to the one peripheral via the respective downstream link; and
   a controller coupled to the upstream and downstream interfaces and configured to:
   receive a command and data via the upstream interface;
   perform a security process during an analysis interval to analyze the received command;
   during the security process:
   (i) stop communication with the at least one peripheral over the respective downstream link: and
   (ii) couple a termination resistor to at least one of the respective downstream link and the upstream link;
   if the security process does not identify a security risk:
   (i) select one of the at least one downstream interface,
   (ii) decouple the termination resistor;
   (iii) enable communication with the at least one peripheral over the respective downstream link; and
   (iv) forward the received command and data to only the selected one of the at least one downstream interface; and
   and if the security process identifies a security risk:
   (i) select none of the at least one downstream interface; and
   (ii) prevent forwarding the received data to any of the at least one downstream interface.

2. A device according to claim 1, wherein the controller is configured to prevent forwarding the received commands and data to at least one of the at least one downstream interface, other than the selected one of the at least one downstream interface.

3. A device according to claim 2, wherein the controller is configured to prevent forwarding the received data by
   changing at least one of the respective downstream link and the upstream link from a linked state to an electrically terminated state.

4. A device according to claim 3, wherein the controller is configured to change the link state to the electrically terminated state by coupling a termination resistor to the at least one of the respective downstream link and the upstream link.

5. A device according to claim 1, wherein the controller is configured to prevent direct communication between any two of the at least one peripheral via a respective downstream link.

6. A device according to claim 1, wherein the controller is configured to:
   garble the received commands and data; and
   forward the garbled commands and data to at least one of the at least one downstream interface, other than the selected one of the at least one downstream interface.

7. A device according to claim 1, wherein each downstream interface is configured to be removably coupled via the respective downstream link to the one of the at least one peripheral.

8. A device according to claim 1, wherein the controller is configured to perform the security process by analyzing the received data to ascertain if the received data poses a security risk.

9. A device according to claim 1, wherein the controller is configured to prevent forwarding the received data by changing at least one of the respective downstream link from a linked state to an electrically terminated state.

10. A device according to claim 9, wherein the controller is configured to change the downstream link from the linked state to the electrically terminated state by coupling the termination resistor to the downstream link.

11. A device according to claim 1, wherein the controller is configured, during at least a portion of the analysis interval, to emulate one of the host and the peripheral to the other of the host and the peripheral.

12. A device according to claim 11, wherein the controller is configured to emulate the one of the host and the peripheral at least in part by generating an acknowledge packet and sending the generated acknowledge packet to the other of the host and the peripheral.

13. A device according to claim 11, wherein the controller is configured to emulate the one of the host and the peripheral at least in part by generating a negative-acknowledge packet and sending the generated negative-acknowledge packet to the other of the host and the peripheral.

14. A device according to claim 11, wherein the controller is configured to emulate the one of the host and the peripheral at least in part by coupling a termination resistor to the link of the other of the host and the peripheral.

15. A device according to claim 1, wherein the controller is configured to perform the security process during an analysis interval, and during the analysis interval:
    (i) disconnect communication with the at least one peripheral over the respective downstream link; and
    (ii) automatically couple a termination resistor to the respective downstream link.

16. A device according to claim 1, wherein the controller is configured to:
    perform the security process by analyzing an address, of an intended peripheral recipient of the received data, in the received command; and
    if the address of the intended peripheral recipient corresponds to one of the at least one peripheral, select the one of the at least one downstream interface to which the intended peripheral recipient is coupled, via a respective downstream link.

17. A device according to claim 1, wherein the security process identifies the security risk based at least in part on type of a peripheral coupled to one of the at least one downstream interface.

18. A device according to claim 1, wherein the security process identifies the security risk based at least in part on type of the data.

19. A device according to claim 1, wherein each downstream interface is configured to receive only data from the one peripheral via the respective downstream link.

20. A security device-implemented method of enhancing security of at least one of (1) a first device, configured to act at a given time as a host computing device ("host"), and (2) at least one second device, configured to act at the same time as a peripheral device ("peripheral"), the security device comprising an upstream interface configured to be coupled via an upstream link to the host and to receive commands and data from the host via the upstream link and to send data to the host via the upstream link, each of at least some of the commands including an address of one of the at least one peripheral, the security device further comprising at least one downstream interface, each downstream interface configured to be coupled via a respective downstream link to one of the at least one peripheral and to receive data from the one peripheral via the respective downstream link and to send commands and data to the one peripheral via the respective downstream link, each peripheral being assigned an address, the method comprising:
    receive a command and data via the upstream interface;
    perform a security process during an analysis interval to analyze the received command;
    during the security process:
    (i) stop communication with the at least one peripheral over the respective downstream link: and
    (ii) couple a termination resistor to at least one of the respective downstream link and the upstream link;
    if the security process does not identify a security risk:
    (i) select one of the at least one downstream interface,
    (ii) decouple the termination resistor;
    (iii) enable communication with the at least one peripheral over the respective downstream link; and
    (iv) forward the received command and data to only the selected one of the at least one downstream interface; and
    and if the security process identifies a security risk:
    (i) select none of the at least one downstream interface; and
    (ii) prevent forwarding the received data to any of the at least one downstream interface.

21. A method according to claim 20, further comprising preventing forwarding the received commands and data to at least one of the at least one downstream interface, other than the selected one of the at least one downstream interface.

22. A method according to claim 21, wherein preventing forwarding the received data comprises
    changing at least one of the respective downstream link and the upstream link from a linked state to an electrically terminated state.

23. A method according to claim 22, wherein changing the link from the linked state to the electrically terminated state comprises coupling a termination resistor to the at least one of the respective downstream link and the upstream link.

24. A method according to claim 20, further comprising preventing direct communication between any two of the at least one peripheral via a respective downstream link.

25. A method according to claim 20, further comprising:
    garbling the received commands and data; and
    forwarding the garbled commands and data to at least one of the at least one downstream interface, other than the selected one of the at least one downstream interface.

26. A method according to claim 20, further comprising performing the security process during an analysis interval.

27. A method according to claim 26, further comprising, during at least a portion of the analysis interval, emulating one of the host and the peripheral to the other of the host and the peripheral.

28. A method according to claim 27, wherein emulating the one of the host and the peripheral comprises, at least in part, generating an acknowledge packet and sending the generated acknowledge packet to the other of the host and the peripheral.

29. A method according to claim 27, wherein emulating the one of the host and the peripheral comprises, at least in part, generating a negative-acknowledge packet and sending the generated packet to the other of the host and the peripheral.

30. A method according to claim 27, wherein emulating the one of the host and the peripheral comprises, at least in part, coupling a termination resistor to the link of the other of the host and the peripheral.

31. A method according to claim 20, wherein performing the security process comprises analyzing the received data to ascertain if the received data poses a security risk.

32. A method according to claim 20, wherein preventing forwarding the received data comprises changing at least one of the respective downstream link from a linked state to an electrically terminated state.

33. A method according to claim 32, changing the at least one of the respective downstream link from a linked state to an electrically terminated state comprises coupling the termination resistor to the downstream link.

34. A method according to claim 20, further comprising performing the security process during an analysis interval, and during the analysis interval:

(i) disconnecting communication with the at least one peripheral over the respective downstream link; and (ii) automatically coupling a termination resistor to the respective downstream link.

35. A method according to claim 20, wherein:

performing the security process comprises analyzing an address, of an intended peripheral recipient of the received data, in the received command; and if the address of the intended peripheral recipient corresponds to one of the at least one peripheral, selecting the one of the at least one downstream interface comprises selecting the one of the at least one downstream interface to which the intended peripheral recipient is coupled, via a respective downstream link.

36. A method according to claim 20, wherein performing the security process comprises identifying the security risk based at least in part on type of a peripheral coupled to one of the at least one downstream interface.

37. A method according to claim 20, wherein performing the security process comprises identifying the security risk based at least in part on type of the data.

38. A method according to claim 20, further comprising receiving only data from the one peripheral via the respective downstream link.

* * * * *